(12) United States Patent
Zhou et al.

(10) Patent No.: US 9,002,397 B2
(45) Date of Patent: Apr. 7, 2015

(54) METHOD AND APPARATUS FOR DEVICE TRANSMIT POWER CAPPING IN WIRELESS COMMUNICATIONS

(75) Inventors: Yan Zhou, San Diego, CA (US); Farhad Meshkati, San Diego, CA (US); Vinay Chande, San Diego, CA (US); Mehmet Yavuz, San Diego, CA (US); Yi Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 264 days.

(21) Appl. No.: 13/171,002

(22) Filed: Jun. 28, 2011

(65) Prior Publication Data
US 2011/0319122 A1    Dec. 29, 2011

Related U.S. Application Data

(60) Provisional application No. 61/359,757, filed on Jun. 29, 2010, provisional application No. 61/387,365, filed on Sep. 28, 2010.

(51) Int. Cl.
*H04B 7/00*     (2006.01)
*H04W 52/14*    (2009.01)
*H04W 52/24*    (2009.01)

(52) U.S. Cl.
CPC .......... *H04W 52/146* (2013.01); *H04W 52/242* (2013.01); *H04W 52/243* (2013.01)

(58) Field of Classification Search
USPC .......... 455/101, 132, 272, 102, 114.2, 115.1, 455/119, 192.1, 296, 522, 452.2, 424, 423, 455/67.11, 436, 445, 446, 450, 453, 464, 455/501, 63.1, 69; 370/252, 329, 278, 294, 370/311, 335, 342, 315, 318, 331, 333, 338, 370/328, 437, 352, 332, 348, 400, 431, 370/441; 375/144, 219, 229, 232, 350, 260, 375/316, 319, 267, 285, 295, 297, 346–348
See application file for complete search history.

(56) References Cited

U.S. PATENT DOCUMENTS 6,038,220 A * 3/2000 Kang et al. ..................... 370/252
6,175,745 B1 * 1/2001 Bringby et al. ............... 455/522
(Continued)

FOREIGN PATENT DOCUMENTS

CN    101399579 A    4/2009
EP    2485544 A1     8/2012
(Continued)

OTHER PUBLICATIONS

International Search Report and Written Opinion—PCT/US2011/042463, International Search Authority—European Patent Office—Sep. 22, 2011.
Taiwan Search Report—TW100122920—TIPO—Jul. 17, 2013.

*Primary Examiner* — Golam Sorowar

(57) ABSTRACT

Methods and apparatuses are provided for determining a transmission power cap for one or more devices based at least in part on pathloss measurements to one or more access points received from the one or more devices. A common transmission power cap can also be computed for assigning to devices communicating with an access point, and the transmission power cap for a given device can be adjusted when the transmission power is at or a threshold level from the common power cap to conserve signaling in the wireless network. Adjustment of the transmission power cap can additionally or alternatively be based on a received power at an access point related to signals from the device, an interference report from one or more access points, and/or the like.

56 Claims, 20 Drawing Sheets

(56) References Cited

U.S. PATENT DOCUMENTS

| | | | |
|---|---|---|---|
| 8,442,572 B2 | 5/2013 | Borran et al. | |
| 2001/0012276 A1* | 8/2001 | Tsunehara et al. | 370/318 |
| 2006/0229088 A1* | 10/2006 | Walter | 455/456.2 |
| 2007/0280170 A1* | 12/2007 | Kawasaki | 370/331 |
| 2008/0146154 A1* | 6/2008 | Claussen et al. | 455/63.1 |
| 2008/0166976 A1 | 7/2008 | Rao | |
| 2010/0246463 A1* | 9/2010 | Papasakellariou et al. | 370/311 |
| 2010/0285795 A1 | 11/2010 | Whinnett | |
| 2010/0311449 A1* | 12/2010 | Whinnett | 455/501 |
| 2011/0195730 A1* | 8/2011 | Chami et al. | 455/501 |

FOREIGN PATENT DOCUMENTS

| | | |
|---|---|---|
| GB | 2462063 A | 1/2010 |
| JP | 2010512680 A | 4/2010 |
| JP | 4482058 B1 | 6/2010 |
| JP | 2010263626 A | 11/2010 |
| KR | 20090091165 A | 8/2009 |
| WO | WO-2008030897 A2 | 3/2008 |
| WO | WO-2008076219 A2 | 6/2008 |
| WO | WO2010006909 A1 | 1/2010 |
| WO | WO2010013055 A1 | 2/2010 |
| WO | WO2010036188 A1 | 4/2010 |

\* cited by examiner

METHOD AND APPARATUS FOR DEVICE TRANSMIT POWER CAPPING IN WIRELESS COMMUNICATIONS

CLAIM OF PRIORITY UNDER 35 U.S.C. §119

The present application for patent claims priority to Provisional Application No. 61/359,757 entitled "MOBILE TRANSMIT POWER CAPPING FOR UPLINK INTERFERENCE MANAGEMENT" filed Jun. 29, 2010, and assigned to the assignee hereof and hereby expressly incorporated by reference herein, as well as Provisional Application No. 61/387,365 entitled "MOBILE TRANSMIT POWER CAPPING FOR UPLINK INTERFERENCE MANAGEMENT" filed Sep. 28, 2010, and assigned to the assignee hereof and hereby expressly incorporated by reference herein.

BACKGROUND

1. Field

The following description relates generally to wireless network communications, and more particularly to capping device transmit power.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more access points via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

To supplement conventional base stations, additional restricted access points can be deployed to provide more robust wireless coverage to mobile devices. For example, wireless relay stations and low power base stations (e.g., which can be commonly referred to as Home NodeBs or Home eNBs, collectively referred to as H(e)NBs, femto access points, femtocells, picocells, microcells, etc.) can be deployed for incremental capacity growth, richer user experience, in-building or other specific geographic coverage, and/or the like. In some configurations, such low power base stations can be connected to the Internet via broadband connection (e.g., digital subscriber line (DSL) router, cable or other modem, etc.), which can provide the backhaul link to the mobile operator's network. Thus, for example, the low power base stations can be deployed in user homes to provide mobile network access to one or more devices via the broadband connection.

In this regard, deployment of such low power base stations is unplanned in many cases, and thus the base stations and/or mobile devices communicating therewith can cause interference to other low power base stations, macrocell base stations, or other devices in the vicinity. Interference mitigation mechanisms exist for low power base stations to set transmission power thereof preventing or lessening interference with other access points. Devices served by the low power access point, however, can still cause interference to the other access points operating in the same frequency as the low power access point (referred to as co-channel interference), or in an adjacent frequency (referred to as adjacent channel interference).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with capping transmission power of devices communicating with an access points to mitigate interference to neighboring access points. In an example, devices served by an access point can measure pathloss and/or similar metrics to other access points, and can report the measurements to the access point. The access point can then compute a transmission power cap for one or more of the devices based at least in part on the measurements corresponding to the other access points. In addition, for example, to lower resulting signaling load at the network, the access point can compute a common transmission power cap for assigning to devices served by the access points, and the transmission power cap for a given device can be adjusted based at least in part on one or more triggers (e.g., transmission power rising above the cap, received signal power from the device above a threshold level, etc.). In another example, the access point can readjust the transmission power cap for a given device based at least in part on parameters received from the other access points regarding the device.

According to an example, a method for determining a transmission power cap for a device to mitigate interference at least at an access point is provided that includes receiving a pathloss measurement to at least one access point from a device and computing a transmission power cap for one or more devices based at least in part on the pathloss measurement. The method also includes causing the one or more devices to communicate according to the transmission power cap.

In another aspect, an apparatus for determining a transmission power cap for a device to mitigate interference at least at an access point is provided. The apparatus includes at least one processor configured to receive a pathloss measurement to at least one access point from a device and compute a transmission power cap for one or more devices based at least in part on the pathloss measurement. The at least one processor is further configured to cause the one or more devices to communicate according to the transmission power cap. The apparatus also includes a memory coupled to the at least one processor.

In yet another aspect, an apparatus for determining a transmission power cap for a device to mitigate interference at least at an access point is provided that includes means for receiving a pathloss measurement to at least one access point from a device and means for computing a transmission power cap for one or more devices device based at least in part on the pathloss measurement. The apparatus further includes means for causing the one or more devices to communicate according to the transmission power cap.

Still, in another aspect, a computer-program product for determining a transmission power cap for a device to mitigate interference at least at an access point is provided including a computer-readable medium having code for causing at least one computer to receive a pathloss measurement to at least one access point from a device and code for causing the at least one computer to compute a transmission power cap for one or more devices based at least in part on the pathloss measurement. The computer-readable medium further includes code for causing the at least one computer to cause the one or more devices to communicate according to the transmission power cap.

Moreover, in an aspect, an apparatus for determining a transmission power cap for a device to mitigate interference at least at an access point is provided that includes a pathloss receiving component for obtaining a pathloss measurement to at least one access point from a device and a transmit power cap computing component for computing a transmission power cap for one or more devices based at least in part on the pathloss measurement. The apparatus further includes a component for causing the one or more devices to communicate according to the transmission power cap.

According to another example, a method of determining to adjust a transmission power cap for a device to mitigate interference at least at an access point is provided that includes obtaining a transmission power cap from an access point and determining that transmission power utilized to transmit one or more signals to the access point is at or at least a threshold level from the transmission power cap. The method also includes notifying the access point that the transmission power is at or at least the threshold level from the transmission power cap.

In another aspect, an apparatus for determining to adjust a transmission power cap for a device to mitigate interference at least at an access point is provided. The apparatus includes at least one processor configured to obtain a transmission power cap from an access point and determine that a transmission power utilized to transmit one or more signals to the access point is at or at least a threshold level from the transmission power cap. The at least one processor is further configured to notify the access point that the transmission power is at or at least the threshold level from the transmission power cap. The apparatus also includes a memory coupled to the at least one processor.

In yet another aspect, an apparatus for determining to adjust a transmission power cap for a device to mitigate interference at least at an access point is provided that includes means for obtaining a transmission power cap from an access point. The apparatus further includes means for notifying the access point that a transmission power utilized to transmit one or more signals to the access point is at or at least a threshold level from the transmission power cap.

Still, in another aspect, a computer-program product for determining to adjust a transmission power cap for a device to mitigate interference at least at an access point is provided including a computer-readable medium having code for causing at least one computer to obtain a transmission power cap from an access point. The computer-readable medium further includes code for causing the at least one computer to determine that a transmission power utilized to transmit one or more signals to the access point is at or at least a threshold level from the transmission power cap and code for causing the at least one computer to notify the access point that the transmission power is at or at least the threshold level from the transmission power cap.

Moreover, in an aspect, an apparatus for determining to adjust a transmission power cap for a device to mitigate interference at least at an access point is provided that includes a transmit power cap receiving component for obtaining a transmission power cap from an access point. The apparatus further includes a cap adjustment triggering component for notifying the access point that a transmission power utilized to transmit one or more signals to the access point is at or at least a threshold level from the transmission power cap.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
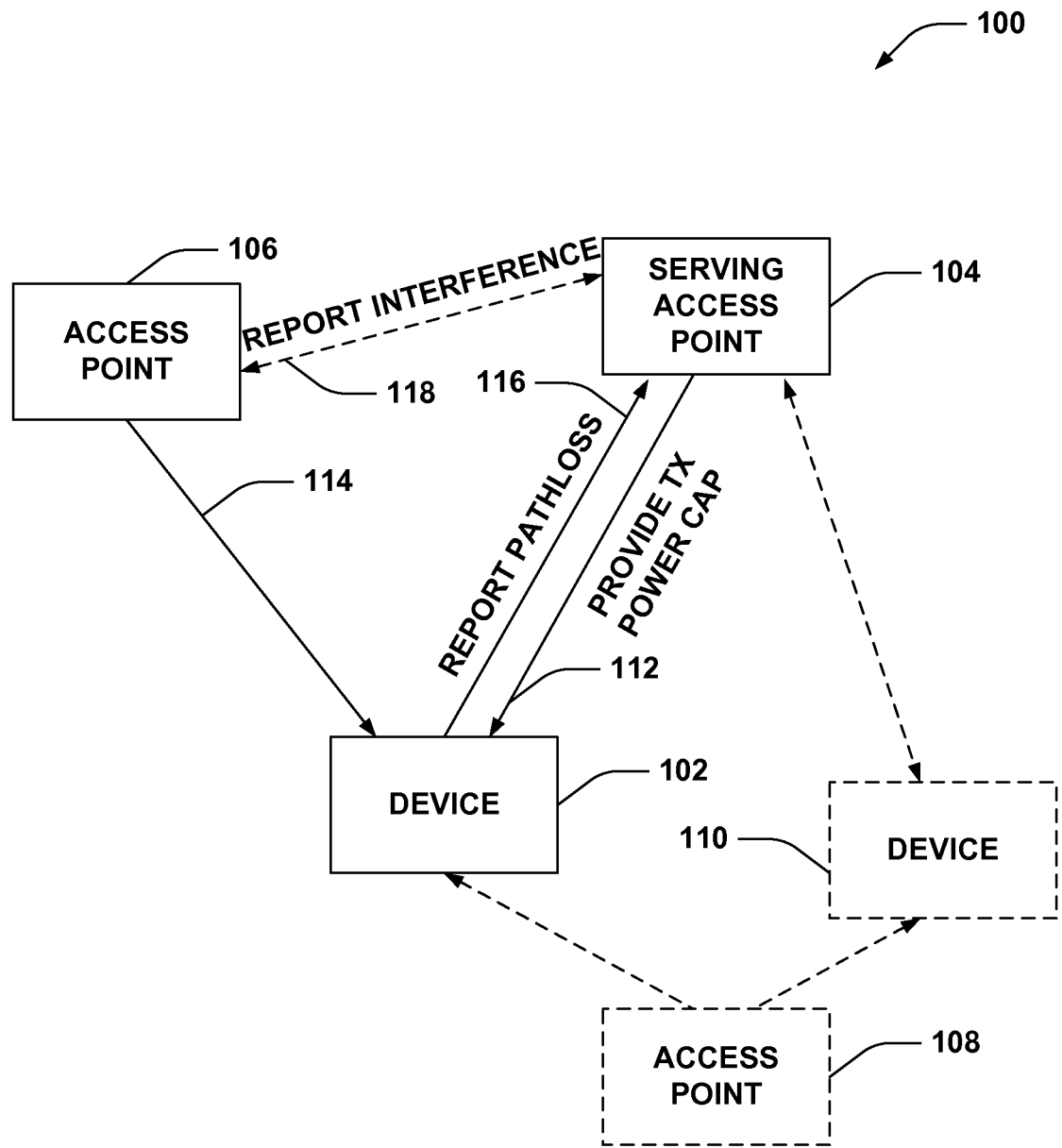
FIG. 1 is a block diagram of an example system that facilitates mitigating interference in a wireless network.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, an access point can cap transmission (Tx) power of one or more served devices to mitigate interference to other access points. The other access points can be in the vicinity of the serving access point such that the one or more served devices may interfere with the other access points when communicating with the serving access point. In one example, the one or more served devices can measure pathloss or other metrics to the other access points, and can indicate the measurements to the serving access point. In this regard, the serving access point can set a transmission power cap for at least one of the one or more served devices based in part on the measurements (e.g., along with a noise floor at the other access points, a power capping threshold, etc.). This can mitigate co-channel and/or adjacent channel interference to the other access points that may otherwise be caused by the at least one device.

In one example, a common transmission power cap can be determined by the access point based at least in part on measurements from various devices for one or more other access points. The transmission power cap can then be adjusted for a given device based at least in part on one or more triggers, such as where the device is at or is at least a threshold level away from the common transmission power cap, where received (Rx) power of a signal from device at the serving access point meets or exceeds a threshold level, etc. In another example, the serving access point adjusts the transmission power cap for a device based at least in part on receiving one or more parameters from the other access points that indicate interference from one or more devices served by the serving access point.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), H(e)NB, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, an example wireless communication system 100 is illustrated that facilitates computing a transmission power cap for a device. System 100 comprises a device 102 that can communicate with a serving access point 104 to receive access to a wireless network and/or one or more components thereof. System 100 can also comprise other access points 106 and/or 108 with which device 102 can potentially interfere. System 100 also optionally comprises another device 110 that can be served by serving access point 104. For example, device 102 and/or 110 can be a UE, modem (or other tethered device), a portion thereof, and/or the like. Access points 104, 106, and/or 108 can each be a femtocell access point (such as a Home Node B or Home evolved Node B, collectively referred to herein as H(e)NB), picocell access point, microcell access point, a mobile base station, a relay node, a device (e.g., communicating in peer-to-peer or ad-hoc mode), a portion thereof, and/or the like.

According to an example, device 102 can potentially interfere with access point 106 and/or 108 while communicating with serving access point 104. As described, serving access point 104, access point 106, and/or access point 108 can be part of a femtocell or other unplanned wireless network deployment, and thus, the access points 104, 106, and/or 108, or devices communicating therewith, can possibly interfere with one another (e.g., where access points are deployed in close proximity). Thus, serving access point 104 can provide a transmission power cap 112 to device 102 to mitigate interference to at least access point 106 caused by communications from device 102. In an example, device 102 can receive a signal 114 from access point 106 and can compute a pathloss thereof or a similar communication metric. Device 102 can report the pathloss 116 to access point 106, or the similar metric, to serving access point 104. Based at least in part on the pathloss or other metric, serving access point 104 can compute a transmission power cap for device 102, and provide the transmission power cap 112 to the device 102. Device 102 can comply with the transmission power cap to mitigate interference to access point 106.

The foregoing, in an example, can result in additional signaling load from device 102. In one example, this can be mitigated, if desired, at least in part by serving access point 104 computing a common transmission power cap for served devices, such as device 102 and/or device 110, which can be modified on a per device basis. For example, serving access point 104 can collect pathloss measurements of access points 106 and 108 from device 102, as well as pathloss measurements of access point 108 from device 110. It is to be appreciated that additional neighboring access points and/or devices served by serving access point 104 can be present, and related pathloss reports can be received by serving access point 104. In any case, serving access point 104 can determine a common transmission power cap for the devices 102 and 110 to mitigate interference with access points 106 and 108.

For example, this can be the minimum computed transmission power cap. In this example, the transmission power cap for device 102 and/or device 110 can be adjusted individually based at least in part on one or more events or other triggers.

For example, the one or more events can occur at device 102, such as determining a transmission power is at or nearing (e.g., at a threshold level near) the transmission power cap. Upon this event, for example, device 102 can notify serving access point 104 by reporting a current transmission power at device 102. In an example, serving access point 104 can request device 102 to report pathloss for access points, such as access point 106 and/or 108, having a related reference transmission power less than a transmission power reported for device 102 to further mitigate signaling related to access points that are not potentially interfered by device 102. In another example, device 102 can determine and report pathloss to one or more of access points 106 and/or 108 to serving access point 104 based on determining the transmission power is at or nearing the transmission power cap. In yet another example, serving access point 104 can measure received power of device 102 at serving access point 104. In this example, where the received power of signals from device 102 at serving access point 104 meets or exceeds a threshold level, the serving access point 104 can similarly configure device 102 to submit pathloss reports corresponding to other access points in the vicinity, such as access points 106 and/or 108. In any case, the transmission power cap for device 102 can be adjusted based on the pathloss measurements.

In yet another example, access point 106 can detect interference from device 102 as beyond a threshold level. In this example, access point 106 can report the interference to serving access point 104 (e.g., over a backhaul connection 118), and serving access point 104 can accordingly adjust the transmission power cap for device 102 to mitigate the interference. For instance, access point 106 can formulate a report including an interference level indicator, which can be an absolute or relative indicator of a total level of interference or a level of interference from device 102, an indicator of a presence of interference from device 102, etc. In another example, access point 106 can generate a report of dominant interfering device identifiers, which can correspond to devices causing at least a threshold level of interference, or a percentile of devices causing the highest level of interference. In either case, serving access point 104 can accordingly adjust the transmission power cap for device 102.

Figure 2:
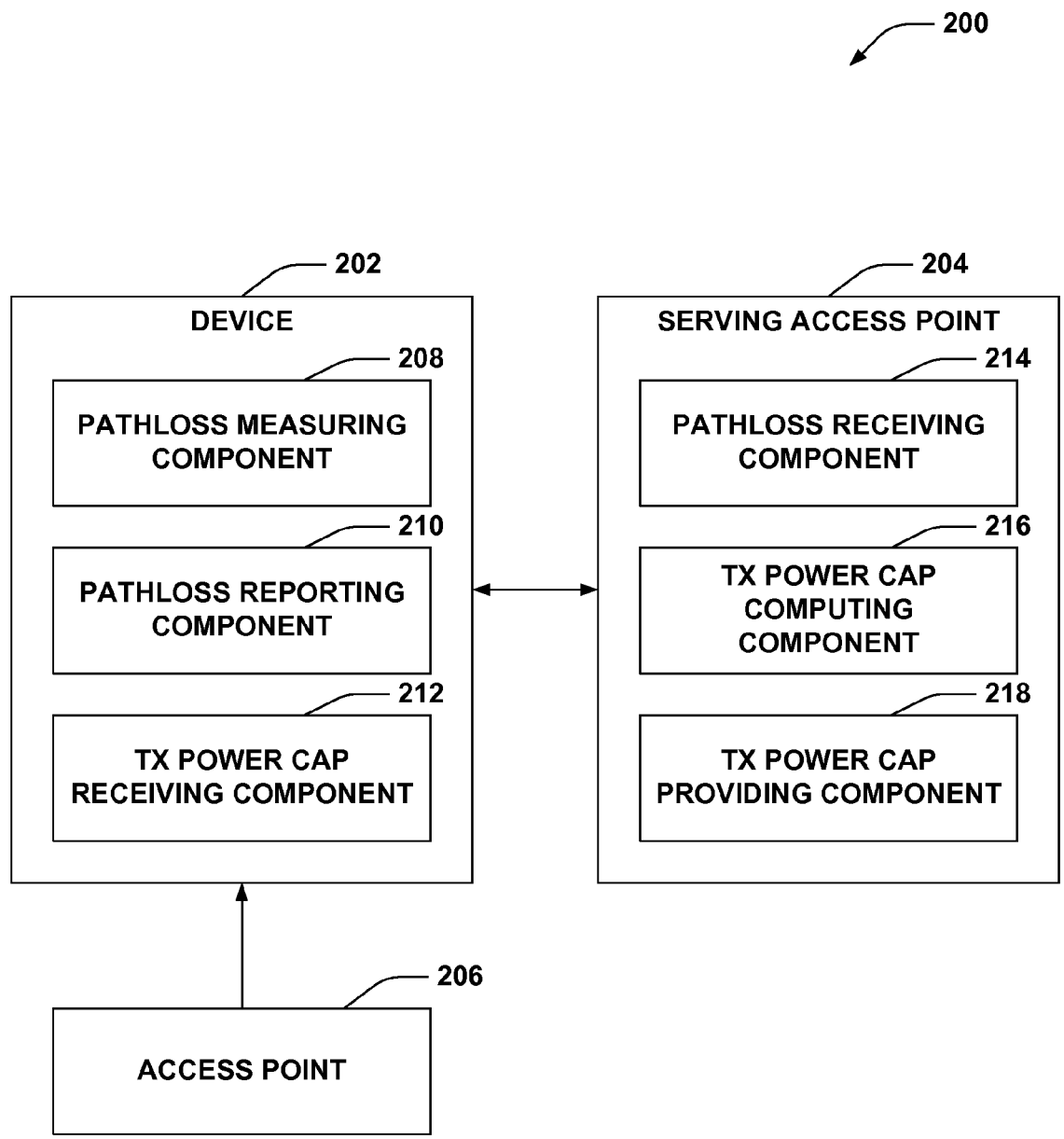
FIG. 2 is a block diagram of an example system for computing a transmission power cap for a device.

Turning to FIG. 2, an example wireless communication system 200 is illustrated that facilitates determining a transmission power cap for a device. System 200 comprises a device 202 that communicates with a serving access point 204 to receive access to one or more wireless network components, as described. In addition, system 200 can include another access point 206 with which device 202 can potentially interfere due at least in part to communicating with serving access point 204. For example, deployment of serving access point 204 can result in interference to other access points in the vicinity of serving access point 204 (not shown), whether caused by serving access point 204, device 202 or other devices communicating with serving access point 204, etc. As described, for example, device 202 can be a UE, modem, etc., and serving access point 204 and access point 206 can each be a femtocell access point, H(e)NB, and/or the like.

Device 202 can comprise a pathloss measuring component 208 that determines a pathloss to one or more access points, a pathloss reporting component 210 that communicates the determined pathloss to one or more access points or devices, and a Tx power cap receiving component 212 that obtains a transmission power cap based at least in part on the pathloss. Serving access point 204 comprises a pathloss receiving component 214 for obtaining a pathloss to one or more access points at a device, a Tx power cap computing component 216 for determining a transmission power cap for the device based at least in part on the pathloss, and a Tx power cap providing component 218 for communicating the transmission power cap to the device.

According to an example, pathloss measuring component 208 can determine a pathloss of one or more signals received from access point 206. For example, this can be based at least in part on a trigger to measure signals from access point 206, such as a timer, a detection of device 202 is at or nearing (e.g., at a threshold level from) a previously received transmission power cap, a request from serving access point 204 to measure one or more access points from which signals can be heard by device 202, and/or the like. In one example, pathloss measuring component 208 can determine the pathloss based at least in part on one or more power measurements, such as a received signal code power (RSCP) of the signal, a common pilot indicator channel (CPICH) transmission power measured for the one or more access points, etc. Moreover, the pathloss measurements can correlate to access points on a same frequency of serving access point 204, an adjacent frequency, and/or the like.

In any case, pathloss reporting component 210 can communicate the measured pathloss, or other power measurements, to serving access point 204. Pathloss receiving component 214 can obtain the measured pathloss from device 202, in this example, and Tx power cap computing component 216 can determine a transmission power cap for device 202 based at least in part on the pathloss to mitigate device 202 interference to access point 206. For example, where the pathloss receiving component 214 obtains a RSCP measurement from the device 202, pathloss receiving component 214 can compute the pathloss to access point 206 based at least in part on the RSCP measurement and a received downlink transmit power utilized by the access point 206 to transmit the signal. For example, pathloss receiving component 214 can determine the downlink transmit power from the device 206 from a access point management server, using an NLM to measure the power, etc. In one example, pathloss receiving component 214, where other power measurements are received, can compute or otherwise estimate a pathloss based on the other power measurements.

In an example, Tx power cap computing component 216 can determine the transmission power cap according to the following formula:

$$TxPwr\_Cap = PL_M + No_M - \Delta_M$$

where $PL_M$ is the pathloss to access point 206 measured by pathloss measuring component 208, $No_M$ is a noise floor at access point 206, and $\Delta_M$ is a transmission power capping threshold. For example, Tx power cap computing component 216 can obtain the noise floor, $No_M$, from access point 206, from a management server for access points (e.g., an H(e)NB management system (HMS)), a gateway or similar network component, a device that forwards signals from access point 206, communicates information previously received from access point 206, etc., and/or the like. $\Delta_M$, for example, can be configured at serving access point 204 (e.g., from a configuration file, from an operations, administration, and management (OAM) procedure, etc.), determined based at least in part on a hardcoding thereof or other specification, and/or the like. In any case, Tx power cap providing component 218 can cause the device 202 to communicate according to the transmission power cap; this can include communicating the transmission power cap to device 202. Tx power cap receiving component 212 can obtain the transmission power cap, and the device 202 can communicate with serving access point 204 taking care not to exceed the transmission power cap.

For example, as device 202 moves away from serving access point 204, device 202 can increase transmission power to improve signal quality and remain in communication therewith. Though the device 202 may eventually determine to set transmission power at the transmission power cap, the device 202 can take some measures to ensure the transmission power cap is not exceeded. In one example, this can eventually result in handover where communications with serving access point 204 degrade beyond a threshold level and device 202 is unable to increase transmission power over the transmission power cap to accommodate. Moreover, in an example, since the device 202 moves throughout the wireless network, device 202 can continually report to serving access point 204 the pathloss to access point 206, which can ensure the transmission power cap at device 202 is updated for multiple specific locations. This can increase signaling load at the wireless network, and thus additional functionality is described herein can be utilized to decrease the pathloss signaling at device 202.

In one example, though not shown, it is to be appreciated that the device 202 can comprise a Tx power cap computing component 216 for computing the transmission power cap locally (e.g., according to one or more preconfigured or obtained algorithms) based on pathloss measurements from pathloss measuring component 208 instead of (or in addition to) reporting the pathloss to the serving access point 204 for computing the transmission power cap. The Tx power cap receiving component 212 can accordingly receive the computed transmission power cap, cause device 202 to utilize the transmission power cap in communicating with serving access point 204.

Figure 3:
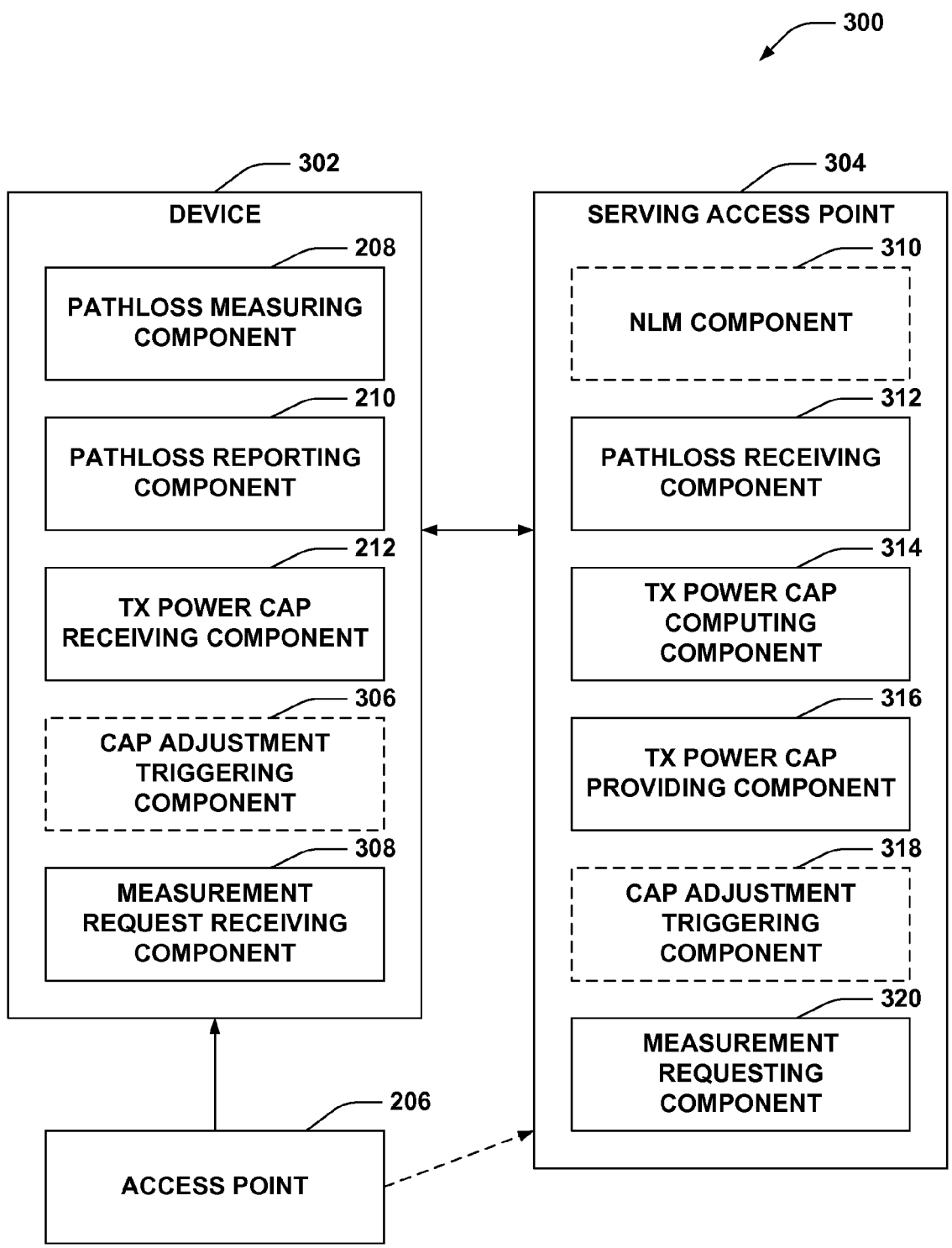
FIG. 3 is a block diagram of an example system for adjusting a common transmission power cap assigned to a device.

Referring to FIG. 3, an example wireless communication system 300 is illustrated for adjusting a transmission power cap for a device. System 300 comprises a device 302 that communicates with a serving access point 304 to receive access to a wireless network. System 300 also comprises an access point 206, with which device 302 can potentially interfere (which can include interfering with devices communicating with access point 206) while transmitting signals to serving access point 304. In this regard, for example, serving access point 304 and/or access point 206 can be deployed within a vicinity of one another. As described, device 302 can be a UE, modem, etc., serving access point 304 and/or access point 206 can each be a macrocell, femtocell, or picocell access point, etc.

Device 302 can comprise a pathloss measuring component 208 for determining a pathloss to one or more access points, a pathloss reporting component 210 for communicating the pathloss to one or more similar or different access points, and a Tx power cap receiving component 212 for obtaining a transmission power cap based at least in part on the reported pathloss. Device 302 also comprises an optional cap adjustment triggering component 306 for determining to request adjustment of the transmission power cap, and a measurement request receiving component 308 for obtaining a request to perform additional pathloss measurements of one or more access points.

Serving access point 304 comprises an optional co-located network listening module (NLM) component 310 for receiving one or more signals from one or more access points for determining a transmit power, determining an access point for monitoring in computing a transmission power cap for a device, etc., a pathloss receiving component 312 for obtaining a pathloss measurement to one or more access points from a device, and a Tx power cap computing component 314 for determining a transmission power cap for the device based at least in part on the pathloss measurement(s). Serving access point 304 can additionally comprise a Tx power cap providing component 316 for communicating the transmission power cap to the device, an optional cap adjustment triggering component 318 for determining to adjust a transmission power cap for a device, and a measurement requesting component 320 for communicating a request to one or more devices to perform additional pathloss measurements.

According to an example, serving access point 304 can collect pathloss statistics for computing a common transmission power cap for devices communicating therewith. The common transmission power cap can be assigned to the devices, and upon one or more triggers, the serving access point 304 can modify a transmission power cap for a given device, as described. Thus, for example, to collect pathloss statistics, measurement requesting component 320 can communicate a request to one or more devices to measure pathloss to surrounding access points. For example, this can occur at initialization of serving access point 304 (e.g., similarly to determining downlink transmission power for the serving access point 304 based on received signal strengths and broadcast information within a related macrocell so as not to substantially interfere with one or more access points in the macrocell).

In an example, measurement requesting component 320 can determine a set of access points to monitor from which one or more transmission power caps can be computed based on pathloss to the set of access points from various devices. For example, measurement requesting component 320 can utilize NLM component 310 to scan a primary scrambling code (PSC) range, or other access point identifying range, to determine access points and/or related cells from which signals can be received by NLM component 310, such as access point 206. In addition, for example, the determined access points can utilize a same operating frequency as access point 304, an adjacent operating frequency, and/or the like.

In another example, measurement requesting component 320 can determine another operating frequency for one or more of the determined access points, and can request that the one or more devices perform an inter-frequency measurement for the one or more of the determined access points over the other operating frequency (e.g., in addition or alternatively to the original operating frequency specified for the one or more of the determined access points). This can facilitate measuring the one or more of the determined access points where one or more devices cannot detect signals therefrom (e.g., the pilot transmit power is received below a threshold detection signal-to-interference ratio (SIR)). In one example, the measurement requesting component 320 can determine to request measuring on the other operating frequency upon not receiving measurements for the one or more of the determined access points within a given period of time. Moreover, in an example, the other operating frequency can be adjacent to the original operating frequency of the one or more of the determined access points.

Once measurement requesting component 320 determines the set of access points and/or associated operating frequencies over which to measure the set of access points, measurement requesting component 320 can configure one or more devices, such as device 302, to measure and report pathloss to at least a portion of access points in the set (e.g., including access point 206) as well as to the serving access point 304, as part of a training period. Measurement request receiving component 308 can obtain the request to measure the pathloss. Pathloss measuring component 208 can accordingly receive signals from at least the portion of the set of access points (e.g., whether in the same frequency as serving access point 304 or in another frequency), and the serving access point 304 and measure pathloss based on the signals.

In this example, pathloss reporting component 210 can communicate the measured pathloss to one or more access points, including serving access point 304 and access point 206, to serving access point 304. It is to be appreciated that pathloss measuring component 208 can measure, and pathloss reporting component 210 can report, pathloss to additional access points having other PSCs, and measurement requesting component 320 can add the additional PSCs to the set of access points. Pathloss receiving component 312 can receive the pathloss measurements from device 302 and/or other devices, as described. In this regard, the pathloss measurements can be received for at least a portion of access points in the set of access points based on different device locations. Pathloss receiving component 312 can construct a pathloss cumulative density function (CDF), or other combination of the pathloss measurements, for each access point for which at least one pathloss measurement is received based at least in part on the pathloss measurements. Alternatively, the pathloss receiving component 312 can characterize pathloss to each access point in the set of access points based at least in part on measuring signals from the access points using NLM component 310.

In yet another example, pathloss receiving component 312 can estimate the pathloss to an access point, such as access point 206, based at least in part on a pilot detection SIR threshold. In this example, pathloss receiving component 312 can determine a pilot detection SIR related threshold to access point 206 and/or access points in general (e.g., as a hardcoded or configured parameter). For example, the pilot detection SIR threshold can correspond to a received signal power over a total noise needed to detect a pilot signal from the access point. Pathloss receiving component 312 can also obtain a strength of a pilot signal transmission of an access point, such as access point 206, from an access point management server, measurements of the access point by NLM component 310, etc. In addition, pathloss measuring component can measure a total received level, Io, and pathloss reporting component 210 can provide the total noise level to serving access point 304. Pathloss receiving component 312 can receive the total noise level and can accordingly compute a pathloss to the access point based on the pilot detection SIR threshold, total noise level, and pilot signal strength transmission measurements. For example, pathloss receiving component 312 can estimate the pathloss based at least in part on the following formula:

$$PL = \text{CPICH\_TxPwr} - Ecp >$$
$$\text{CPICH\_TxPwr} - (Io + \text{Detect\_Thres})$$
$$\stackrel{\Delta}{=} \text{PL\_lower\_bound}$$

where PL_lower_bound gives the estimated pathloss, Detect_Thres is the pilot detection SIR threshold, and CPICH_Tx_Pwr is the pilot signal strength measurement.

Once the pathloss receiving component 312 obtains a number of pathloss measurements and determines the CDF for the portion of access points, pathloss receiving component 312 can also compute a pathloss difference CDF for each access point in the portion of the set of access points for which pathloss measurements are received. For example, for each pathloss measurement reported for serving access point 304 from a device, $PL_S$, such as device 302, pathloss receiving component 312 can determine pathloss to the ith access point, $PL_M(i)$, reported at the closest time from the specific device. For example, pathloss receiving component 312 can evaluate i pathloss measurements reported by the device to determine the one with the closest time, where i is the number of access points in the set for which pathloss measurements are received. Pathloss receiving component 312 can compute the difference in the pathloss measurements, $PL_M(i)-PL_S$, for each reported $PL_S$, and can accordingly construct the pathloss difference CDF.

Alternatively, where pathloss receiving component 312 characterizes the pathloss difference using the NLM component 310, the pathloss receiving component 312 can compute the pathloss difference using the measured pathloss of an access point in the set of access points acquired from NLM component 310 along with an assumed pathloss of serving access point 304 (e.g., 90 decibel (db) coverage radius based on downlink transmission power). In either example, Tx power cap computing component 314 can determine a common transmission power cap for devices communicating with serving access point 304, such as device 302, based at least in part on the pathloss difference CDF or other computed pathloss differences to access points in the set of access points. For example, Tx power cap computing component 314 can determine the common transmission power cap based at least in part on a pathloss to an access point in the set of access point having the lowest pathloss measurement, $PL_M(i)$, or pathloss difference measurement, $PL_M(i)-PL_S$.

For example, Tx power cap computing component 314 can determine a pathloss threshold for the set of access points based at least in part on the previously determined CDF or pathloss difference CDF. For example, the pathloss threshold can be determined based at least in part on one or more reported pathloss differences in the CDF. In one example, Tx power cap computing component 314 can determine the pathloss threshold to be a certain percentile calculation of the pathloss differences in the CDF (e.g., the lowest reported pathloss difference, a n-percentile of lowest reported pathloss differences, etc.). For at least a portion of the access points for which pathloss information is received, Tx power cap computing component 314 can compute reference transmission powers corresponding to the portion of the access points that can be used for a transmission power cap readjustment trigger at the one or more devices. For example, the reference transmission powers can be similar to individual transmission power caps computed for each of the access points based on pathloss measurements thereto.

In one example, Tx power cap computing component 314 can compute the reference transmission powers according to the following formula or a similar formula:

$$TxPwr\_ref(i)=PL\_thres(i)+No_M(i)-\Delta_M(i)$$

where $PL\_thres(i)$ is the pathloss threshold for a given ith access point, $No_M(i)$ is the noise floor for the ith access point, and $\Delta_M(i)$ is the capping threshold, as described. For example, $PL\_thres(i)$ can be a minimum, maximum, average, etc., pathloss to the access point as measured by various devices. It is to be appreciated that a device is unlikely to interfere with the ith access point where the device's transmission power is below the reference transmission power. Thus, for example, Tx power cap computing component 314 can determine the common transmission power cap or a reporting threshold based at least in part on the following formula or a similar formula:

$$TxPwr\_thres = \min_i(TxPwr\_ref(i))$$

For example, the common transmission power cap can also be referred to as a reporting threshold, which device 302 can utilize to determine when to notify serving access point 304 of a transmission power used by device 302. In another example, the reporting threshold can be a difference from the common transmission power cap. Thus, where the reporting threshold is used to determine when to notify serving access point 304 of the transmission power, exceeding the common transmission power cap can be prevented. The above value can be referred to in the following examples as a reporting threshold, though the concepts can be applied for a common transmission power cap as well, where different from a reporting threshold. Thus, Tx power cap providing component 316 can communicate the reporting threshold to device 302. Tx power cap receiving component 212 can obtain the reporting threshold, as described.

In this example, cap adjustment triggering component 306 can determine when transmission power of the device 302 is nearing, has reached, or exceeded the reporting threshold. Upon occurrence of this event, cap adjustment triggering component 306 can notify serving access point 304, and/or can provide a current transmission power of device 302 thereto. Measurement requesting component 320 can accordingly determine one or more access points in the set of access points described above having TxPwr_ref(i), as previously computed, below the reported transmission power at device 302 to further reduce signaling load. Measurement requesting component 320 can request that device 302 report, to the serving access point 304, pathloss to the determined access points (e.g., which can include access point 206). In another example, pathloss measuring component 208 can measure pathloss to one or more access points, and pathloss reporting component 210 can communicate the pathloss measurements to serving access point 304 based at least in part on cap adjustment triggering component 306 determining that transmission power of device 302 is nearing, at, or exceeding the reporting threshold.

For example, measurement request receiving component 308 can obtain the request for performing additional measurements and/or an indication of the access points for which pathloss measurements are desired, and pathloss measuring component 208 can again determine pathloss to the access points from signals received therefrom. Pathloss reporting component 210 can report the pathloss measurement(s) to serving access point 304. Pathloss receiving component 312 can obtain the pathloss measurements of the access points (e.g., the access points having the reference transmission power below the power reported by device 302, as described). The access points for which pathloss measuring component 208 determines a pathloss can be referred to herein as monitored access points. Tx power cap computing component 314 can adjust the transmission power cap for the device as related to the access points based at least in part on the following formula or a similar formula:

$$Max\_TxPwr(k)=PL_M(k)+No_M(k)-\Delta_M(k)$$

where $PL_M(k)$, $No_M(k)$, and $\Delta_M(k)$ are respectively the reported pathloss, noise floor, and capping threshold for the kth reported monitored access point. Accordingly, the adjusted transmission power cap for the device 302 can be computed as:

$$TxPwr\_Cap = \max\left(\min_k(Max\_TxPwr(k)), TxPwr\_thres + \delta\right)$$

where margin δ is set to ensure the serving access point 304 can receive pathloss reports from the device 302 though transmission power is capped (e.g., since the device may not report pathloss where TxPwr_Cap≤TxPwr_thres+δ. In any case, Tx power cap providing component 316 can communicate the adjusted transmission power cap to device 302, and device 302 can utilize the transmission power cap in communicating with serving access point 304. In another example, it is to be appreciated that the cap adjustment triggering component 306 can again notify serving access point 304 if the transmission power at device 302 is at or at least a threshold level from the adjusted transmission power cap.

In this regard, excessive signaling can be mitigated in the wireless network as pathloss is reported by device 302 when transmission power is at or nearing the common transmission power cap for the set of access points, and not necessarily continuously. The signaling is further lessened based at least in part on device 302 reporting pathloss for access points having a reference transmission power below the power reported for device 302, and not necessarily all access points in the set.

In another example, received power of the device 302 at serving access point 304 can be a trigger for adjusting a transmission power cap instead of or in addition to the common transmission power cap (e.g., where the received power is above a threshold level). For example, as described, measurement requesting component 320 can request a pathloss measurement from device 302 and/or one or more other devices to serving access point 304 as well as one or more other access points, such as access point 206. In this regard, measurement request receiving component 308 can obtain the request, pathloss measuring component 208 can determine pathloss to serving access point 304 and other access points based at least in part on signals received therefrom, and pathloss reporting component 210 can report the pathloss measurement(s) to serving access point 304. Cap adjustment triggering component 318 can determine a threshold received power for device 302 based at least in part on the pathloss measurements or one or more other signals received therefrom for triggering a transmission power cap adjustment.

For example, cap adjustment triggering component 318 can determine the threshold received power according to the following formula or a similar formula:

$$RxPwr\_thres = Func(PL_M - PL_S) + No_M - \Delta_M$$

where Func(PL$_M$-PL$_S$) represents a function of the statistics of PL$_M$-PL$_S$, as described previously, such as a minimum function, a n-percentile function of the pathloss difference CDF, and/or the like. The aforementioned formula can be justified based at least in part on the following. The power of the device 302 at the serving access point 304 can be expressed as:

$$RxPwr_S = TxPwr - PL_S$$

where TxPwr is the transmit power at device 302, and PL$_S$ is pathloss from device 302 to serving access point 304. To control interference, received power at one or more other access points, such as access point, can be limited as:

$$RxPwr_M = TxPwr - PL_M < No_M - \Delta_M$$

where here PL$_M$, No$_M$, and Δ$_M$ are respectively the reported pathloss, noise floor, and capping threshold for the one or more other access points. Combining this with the preceding formula can render the following:

Thus, the function for cap adjustment triggering component 318 determining the received power threshold can be determined according to this condition.

For example, similarly as described above, measurement requesting component 320 can request pathloss measurements from one or more devices (e.g., upon initialization), pathloss receiving component 312 can obtain the measurements and construct a CDF, pathloss difference CDF based on pathloss difference with respect to pathloss of serving access point 304 at the device, etc. Based at least in part on the pathloss difference CDF, for example, cap adjustment triggering component 318 can determine a received power threshold relating to an ith access point as:

$$RxPwr\_thres(i) = Func(PL_M(i) - PL_S) + No_M(i) - \Delta_M(i)$$

Thus, cap adjustment triggering component 318 can determine a received power of device 302, and where the received power is greater than RxPwr_thres(i) for an ith access point, such as access point 206, measurement requesting component 320 can configure device 302 to report one or more pathloss measurements for adjusting the transmission power cap, as described previously. In this example, the transmission power cap for device 302 relating to the access point can be computed as:

$$Max\_TxPwr(i) = PL_M(i) + No_M(i) - \Delta_M(i)$$

and for multiple access points for which received power of the device 302 exceeds the threshold level, transmission power cap for the device can be computed as:

$$TxPwr\_Cap = \min_i(Max\_TxPwr(i))$$

Thus, signaling in the wireless network can be reduced since pathloss is reported when the device 302 received power is at or exceeds the threshold, and for corresponding access points; not necessarily all access points in the set, as described.

Moreover, for example, Tx power cap computing component 314 can determine the capping threshold Δ$_M$(i) for one or more access points based on one or more parameters, such as a type of an access point (e.g., of access point 206 or other access points). In one example, Δ$_M$(i) for access point 206 can be 10 db where access point 206 is a macrocell access point, 5 db where a picocell access point, 0 db where a femtocell access point, etc.; thus more protection can be provided the lower the value of Δ$_M$(i). In another example, Δ$_M$(i) can be additionally or alternatively computed based at least in part on a number of devices served by serving access point 304. For example, Δ$_M$(i) can be computed as:

$$\tilde{\Delta}_M(i) = \Delta_M(i) + \left[\frac{Current\_Served\_Device\_Num}{Max\_Served\_Device\_Num}\right]$$

where Δ$_M$(i) can be computed based on a type of access point 206, as described. Thus, the Tx power cap computing component 314 computes the capping threshold based at least in part on the capacity at the access point and the type thereof. Thus, for example, where an access point serves a lesser number of devices, the capping threshold can be lower to allow the devices to have similar interference.

Figure 4:
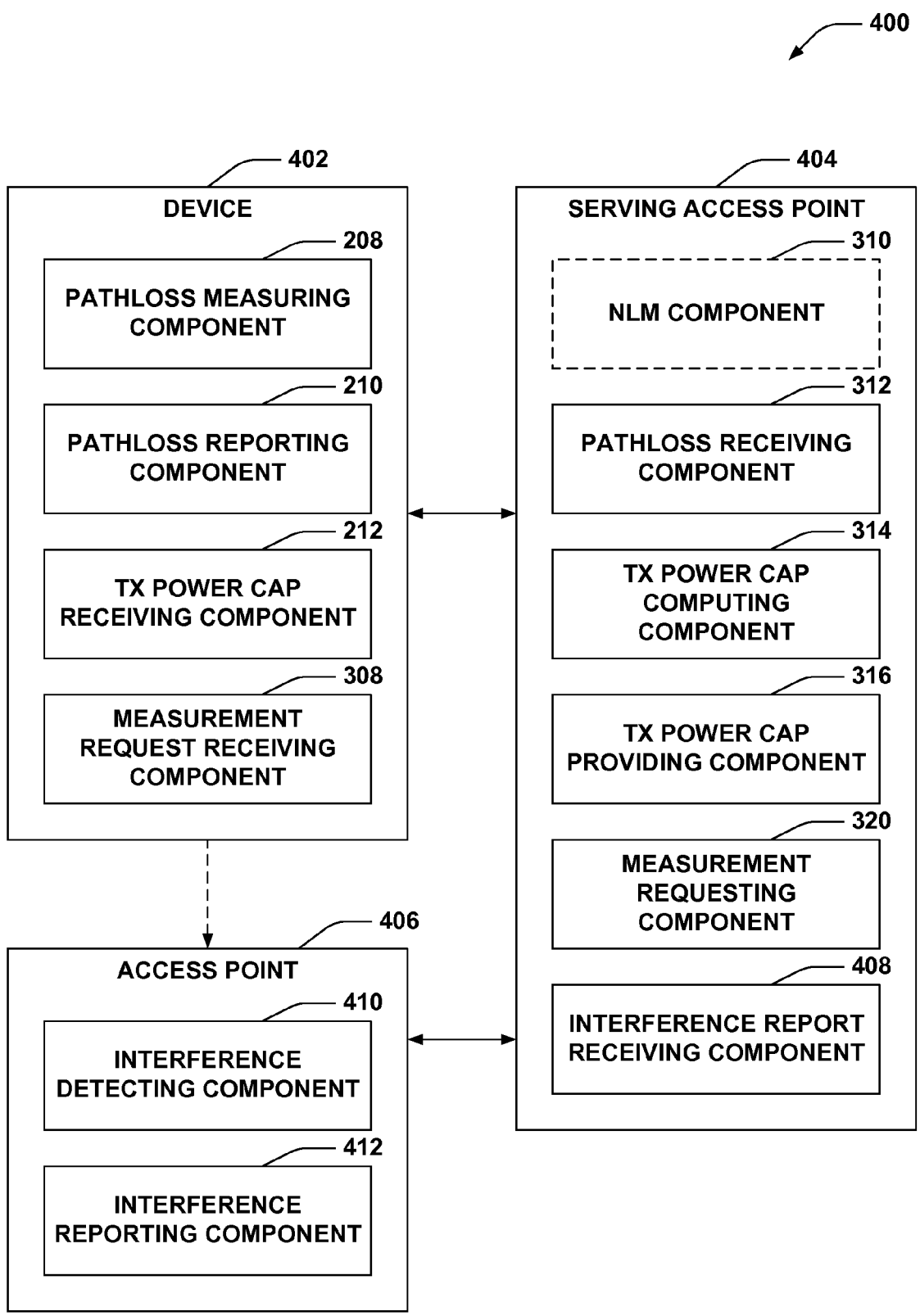
FIG. 4 is a block diagram of an example system for adjusting a transmission power cap based on an interference report from an access point.

FIG. 4 depicts an example wireless communication system 400 for adjusting a transmission power cap for a device.

System 400 comprises a device 402 that communicates with a serving access point 404 to receive access to a wireless network. System 400 also comprises an access point 406, with which device 402 can potentially interfere (which can include interfering with devices communicating with access point 406) while transmitting signals to serving access point 404. In this regard, for example, serving access point 404 and/or access point 406 can be deployed within a vicinity of one another. As described, device 402 can be a UE, modem, etc., serving access point 404 and/or access point 406 can each be a macrocell, femtocell, or picocell access point, an/or the like.

Device 402 can comprise a pathloss measuring component 208 for determining a pathloss to one or more access points, a pathloss reporting component 210 for communicating the pathloss to one or more similar or different access points, and a Tx power cap receiving component 212 for obtaining a transmission power cap based at least in part on the reported pathloss. Device 402 also comprises a measurement request receiving component 308 for obtaining a request to perform additional pathloss measurements of one or more access points.

Serving access point 404 comprises an optional NLM component 310 for receiving one or more signals from one or more access points for determining a transmit power, determining an access point for monitoring in computing a transmission power cap for a device, etc., a pathloss receiving component 312 for obtaining a pathloss measurement to one or more access points from a device, and a Tx power cap computing component 314 for determining a transmission power cap for the device based at least in part on the pathloss measurement(s). Serving access point 404 can additionally comprise a Tx power cap providing component 316 for communicating the transmission power cap to the device, a measurement requesting component 320 for communicating a request to one or more devices to perform additional pathloss measurements, and an interference report receiving component 408 for obtaining one or more parameters from the one or more access point related to interference by one or more devices served by serving access point 404.

Access point 406 comprises an interference detecting component 410 for determining interference from one or more devices communicating with a different access point, and an interference reporting component 412 for communicating one or more parameters related to the interference to the different access point.

According to an example, device 402 can interfere with access point 406 at least on some level when transmitting to serving access point 404. Interference detecting component 410 can measure interference from device 402 and/or other devices communicating with serving access point 404 and/or other access points. For example, interference detecting component 410 can receive signals from the device 402 or other devices, and can store an identifier related to the signal (e.g., a scrambling code, an identifier from a decoded portion of the signal, or other parameter for identifying device 402 and/or serving access point 404, etc.) along with a level of interference (e.g., an interference over thermal (IoT), or similar measurement).

Upon occurrence of an event or other trigger, interference reporting component 412 can transmit interference information to serving access point 404. In one example, interference reporting component 412 can indicate the interference to serving access point 404 based at least in part on a timer. In another example, interference reporting component 412 can indicate the interference based at least in part on interference from one or more devices, or a total level of interference, meeting or exceeding a threshold level (e.g., a threshold IoT). In either example, interference detecting component 410 can determine devices that dominantly interfere with access point 406. For example, this can relate to the top n-percentile of devices, a number of devices, devices with an associated IoT over a threshold level, etc. For the purposes of this discussion, this can include device 402.

Interference reporting component 412, in this example, can identify one or more access points in the vicinity to which to indicate the interference. For example, this can be based at least in part on determining that devices interfering with access point 406 are communicating with the one or more access points, such as serving access point 404. In one example, interference reporting component 412 indicates access points to which interfering devices relate based at least in part on a scrambling code used by the device. In an example, access points can be associated with a range of scrambling codes, and the association can be communicated to other access points. For example, an HMS, OAM, etc., can associate the access points with the scrambling codes and/or indicate such associations to other access points, as described. Thus, interference reporting component 412 can determine a scrambling code used by device 402 is within the range associated with serving access point 404.

Upon identifying one or more related access points, interference reporting component 412 can transmit information regarding the interference to the one or more related access points. For example, the information can include a total interference at access point 406 (e.g., as caused by the device and/or other devices), a list of device identifiers that indicate the dominant interfering devices, etc. In this example, interference detecting component 410 determines device 402 is a dominant interferer, and can transmit the interference report including an identifier of device 402 to serving access point 404 (e.g., over a wired or wireless backhaul connection). Interference report receiving component 408 can obtain the interference report from access point 406, and can determine one or more devices indicated in the report served by serving access point 404.

Accordingly, measurement requesting component 320 can transmit a request to the one or more devices, including device 402, to provide one or more pathloss measurements (e.g., of the set of access points initially discovered by serving access point 404, an access point 406 from which an interference report is received, etc.). In another example, measurement requesting component 320 can request pathloss measurements from additional devices served by serving access point 404, as described above. In this example, measurement request receiving component 308 can obtain the request, pathloss measuring component 208 can measure pathloss to one or more access points, and pathloss reporting component 210 can indicate the measured pathloss to serving access point 404, as described. In addition, pathloss receiving component 312 can obtain the pathloss measurements, Tx power cap computing component 314 can determine a transmission power cap based at least in part on the pathloss measurements, and Tx power cap providing component 316 can communicate the transmission power cap to device 402, which can be received by Tx power cap receiving component 212, as described.

In one example, where interference report receiving component 408 repetitively obtains interference reports from access point 406 (e.g., a threshold number of times in a specified time period), Tx power cap computing component 314 can increase the transmission power cap for device 402 and/or other interfering devices served by serving access point 404 by the difference between the indicated interference level and a desired level of interference. For example, the desired interference level can be received from access point 406 (e.g., in the interference report), an HMS, OAM, etc. Thus, in the foregoing examples, transmission power cap adjustment is based on actual interference experienced at the access point 406, which can reduce signaling as the access point 406 provides interference reports when interference meets or exceeds a threshold level, for example. In addition, this mechanism for controlling device power can reduce interference caused by substantially any transmitted signal, including pilot signals.

Referring to FIGS. 5-11, example methodologies relating to utilizing a transmission power cap to mitigate device interference in a wireless network are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Figure 5:
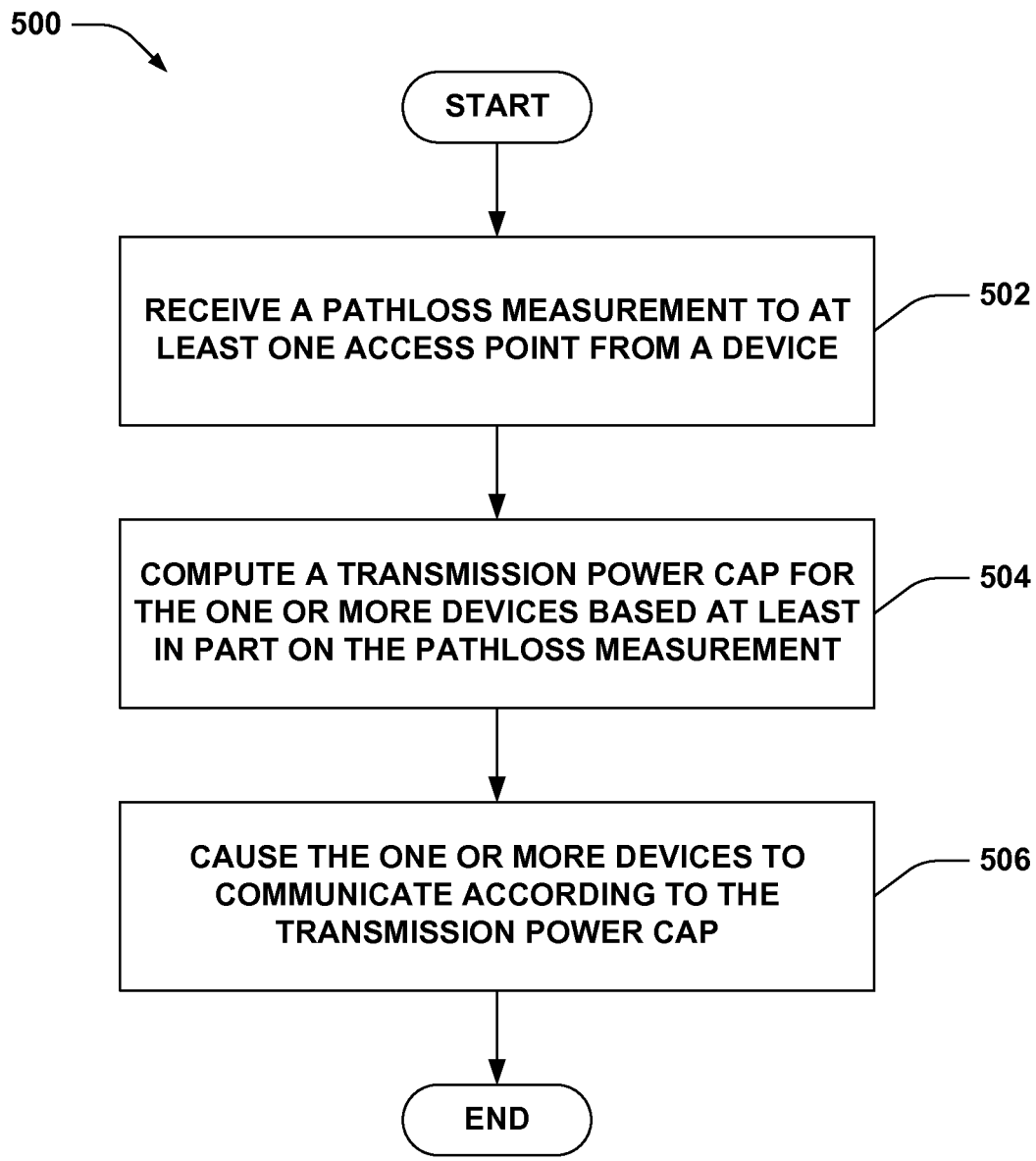
FIG. 5 is a flow chart of an aspect of an example methodology for determining a transmission power cap for a device.

Referring to FIG. 5, an example methodology 500 is displayed that facilitates determining a transmission power cap for a device. At 502, a pathloss measurement to at least one access point can be received from a device. As described, this can be a pathloss to a serving access point, another access point in the vicinity of the device, and/or the like. Moreover, as described, the pathloss measurement can comprise one or more power measurements, such as a RSCP, CPICH transmission power, etc. At 504, a transmission power cap can be computed for the one or more devices based at least in part on the pathloss measurement. In an example, this can be computed based additionally on a noise floor determined for the at least one access point, a capping threshold, etc. For example, as described, the transmission power cap can be computed as specific to the device to mitigate interference with the at least one access point, as common for the access point or other access point based on the pathloss measurement or other pathloss measurements from other devices, etc. In addition, the one or more devices can include the device from which the pathloss measurement is received. At 506, the one or more devices can be caused to communicate according to the transmission power cap. For example, this can include communicating the transmission power cap to the device. In any case, the device can utilize the transmission power cap in communicating with a serving access point to mitigate interference with the at least one access point or other access points, as described.

Figure 6:
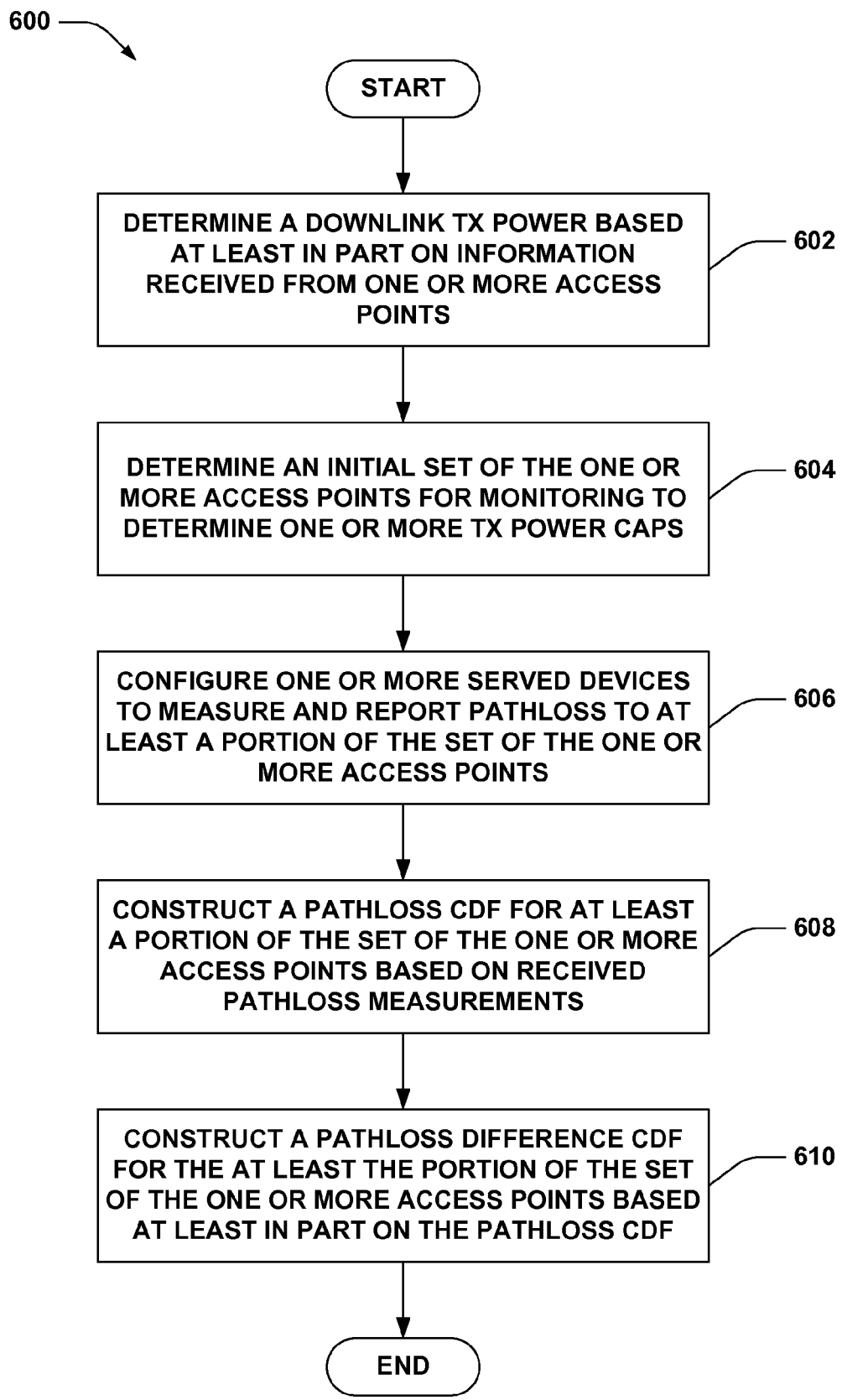
FIG. 6 is a flow chart of an aspect of an example methodology for constructing a pathloss difference cumulative density function for one or more access points.

Turning to FIG. 6, an example methodology 600 is displayed that facilitates determining pathloss differences between one or more access points and a serving access point. At 602, a downlink transmission power is determined based at least in part on information received from one or more access points. For example, the information can include one or more signals, and the downlink transmission power can be determined so as not to interfere with the one or more access points based on a strength of the signals. At 604, an initial set of the one or more access points can be determined for monitoring to determine one or more transmission power caps. As described, this can be determined using a co-located NLM or one or more other devices to detect signals from the one or more access points. In addition, the set of access points can be selected based at least in part on a type of the access point, an identifier thereof, a PSC used by the access points, and/or the like. In another example, as described, one or more served devices can add access points to the list (e.g., based at least in part on detecting PSCs from received signals that are not in the list received by access point).

Once the set of access points is determined, at 606, one or more served devices can be configured to measure and report pathloss to at least a portion of the set of the one or more access points. In this regard, the one or more served devices can measure pathloss to at least a portion of the set of the one or more access points, as described, and can report the pathloss. This can be referred to as a training period. At 608, a pathloss CDF can be constructed for at least a portion of the set of the one or more access points based on received pathloss measurements. At 610, a pathloss difference CDF can be constructed for the at least the portion of the set of the one or more access points based at least in part on the pathloss CDF. As described, for example, this can include determining a pathloss difference between each access point in the pathloss CDF and a serving access point. The pathloss difference CDF, as described above and further herein, can be utilized to determine a common transmission power cap, adjust a transmission power cap for a device, etc.

Figure 7:
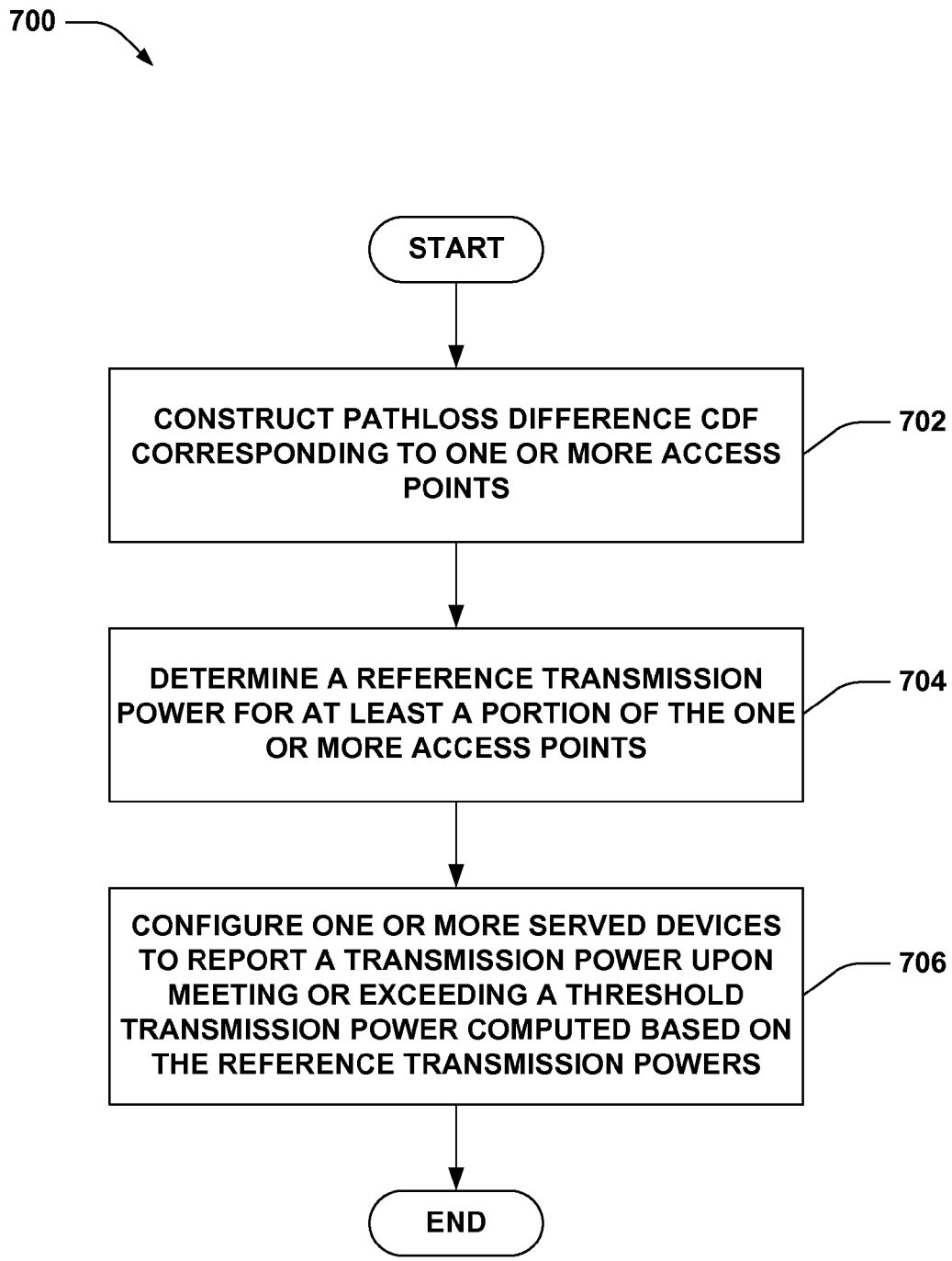
FIG. 7 is a flow chart of an aspect of an example methodology that configures devices to report transmission power when the devices is at or a threshold level near one or more reference transmission powers.

Referring to FIG. 7, an example methodology 700 for computing a common transmission power cap is illustrated. At 702, a pathloss difference CDF corresponding to one or more access points can be constructed. For example, this can be performed as described above, based at least in part on a difference between one or more pathloss measurements to one or more access points from one or more devices and a pathloss measurement to a serving access point from the one or more devices. At 704, a reference transmission power can be determined for at least a portion of the one or more access points. As described, in an example, the reference transmission power can be computed similarly to a transmission power cap for each of the one or more access points (e.g., based at least in part on a pathloss measurement, noise floor, capping threshold, etc.). In one example, a pathloss threshold can be used to compute the reference transmission power for an access point, which can be a maximum, minimum, average, etc., of one or more pathloss measurements of one or more devices to the access point. At 706, one or more served devices can be configured to report a transmission power upon meeting or exceeding a threshold transmission power computed based on the reference transmission powers. As described, for example, the threshold transmission power can be a minimum of the computed reference transmission powers. This can also be a common transmission power cap, as described above for example. Upon a device reporting a transmission power based on meeting or exceeding the threshold transmission power, for example, the transmission power cap for the device can be adjusted to mitigate interference to one or more access points.

Figure 8:
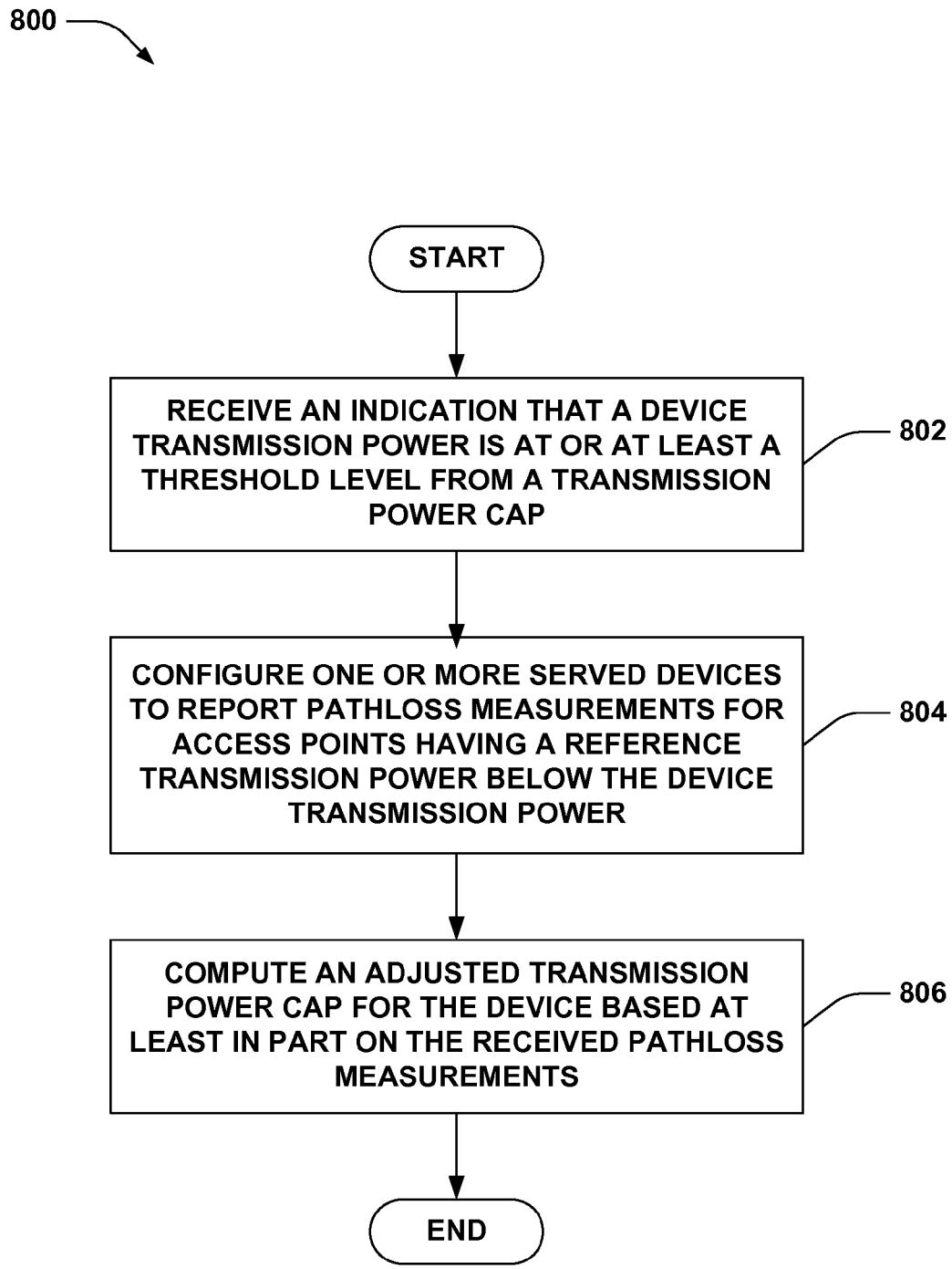
FIG. 8 is a flow chart of an aspect of an example methodology for adjusting a transmission power cap for a device based on determining that the device transmission power is at or is a threshold level near a previous transmission power cap.

Turning to FIG. 8, an example methodology 800 is depicted for adjusting a transmission power cap for a device based at least in part on determining the device transmission power is at or exceeds a reference transmission power. At 802, an indication that a device transmission power is at or at least at a threshold level from a transmission power cap can be received. For example, the transmission power cap can be a common transmission power cap computed, as described above (e.g., based on reference transmission powers for various access points), and provided to the device. Thus, the device can report the transmission power, as described. At 804, one or more served devices can be configured to report pathloss measurements for access points having a reference transmission power below the device transmission power. As described, the served devices can include the device, and can perform the measurements for the access points as indicated and/or received pathloss reports can be filtered to obtain those of the intended access points, etc. At 806, an adjusted transmission power cap can be computed for the device based at least in part on the received pathloss measurements.

Figure 9:
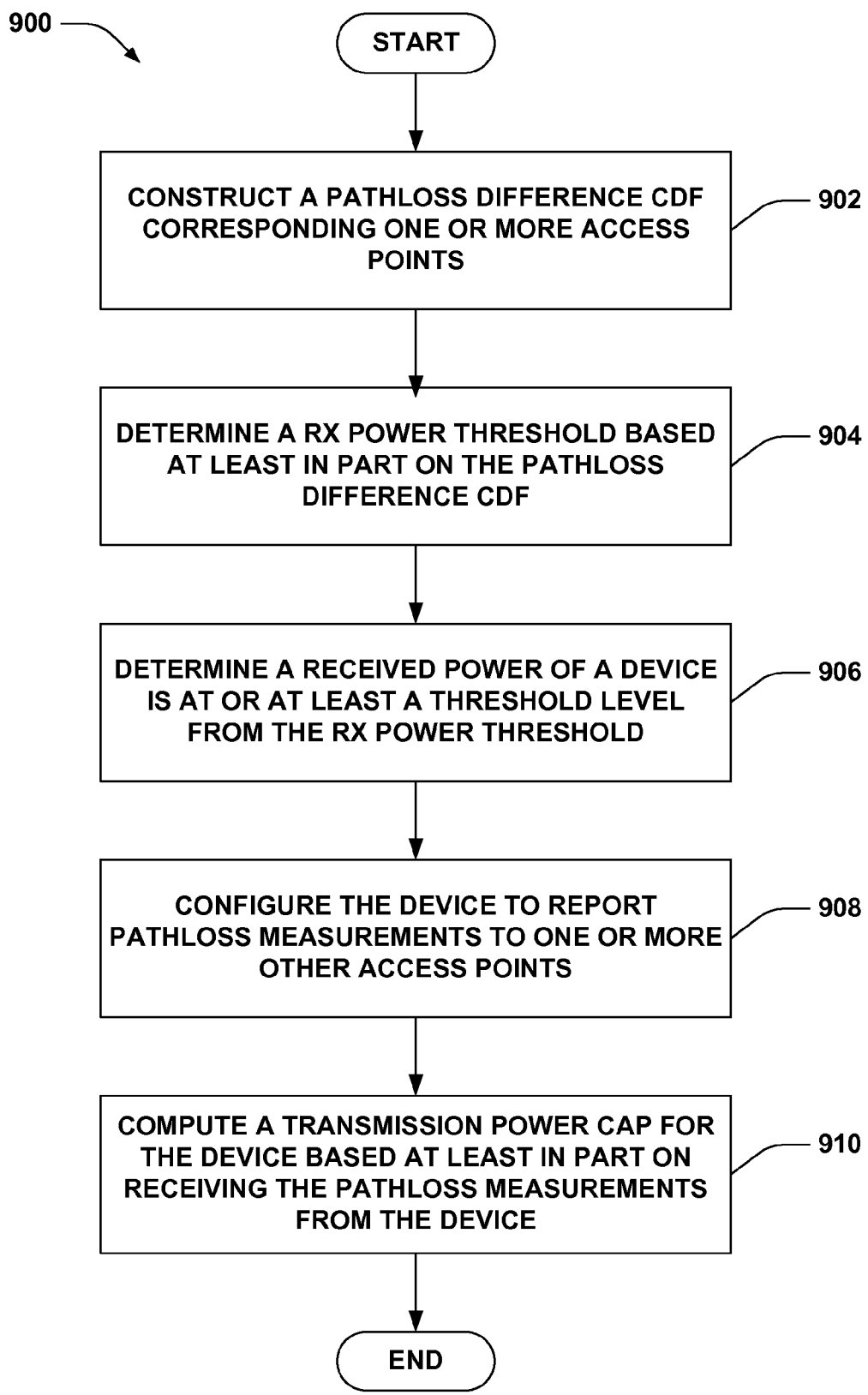
FIG. 9 is a flow chart of an aspect of an example methodology that computes a transmission power cap for a device based at least in part on a received signal power.

Referring to FIG. 9, an example methodology 900 that facilitates determining a transmission power for a device based on a received power thereof is illustrated. At 902, a pathloss difference CDF can be constructed corresponding to one or more access points. As described previously, this can be based at least in part on a difference between a pathloss of the one or more access points and a serving access point of one or more related device as measured by the one or more related devices. At 904, a received power threshold can be determined based at least in part on the pathloss difference CDF. For example, as described, this can be computed as a function of a pathloss to one or more of the access point and the serving access point, and can be computed for each of the one or more access points. At 906, it can be determined that a received power of a device is at or at least a threshold level from the received power threshold. For example, this can be based at least in part on measuring a power of one or more received signals from the device. At 908, the device can be configured to report pathloss measurements to one or more other access points. In addition, other devices can be so configured, in one example. At 910, a transmission power cap can be computed for the device based at least in part on receiving the pathloss measurements from the device, as described.

Figure 10:
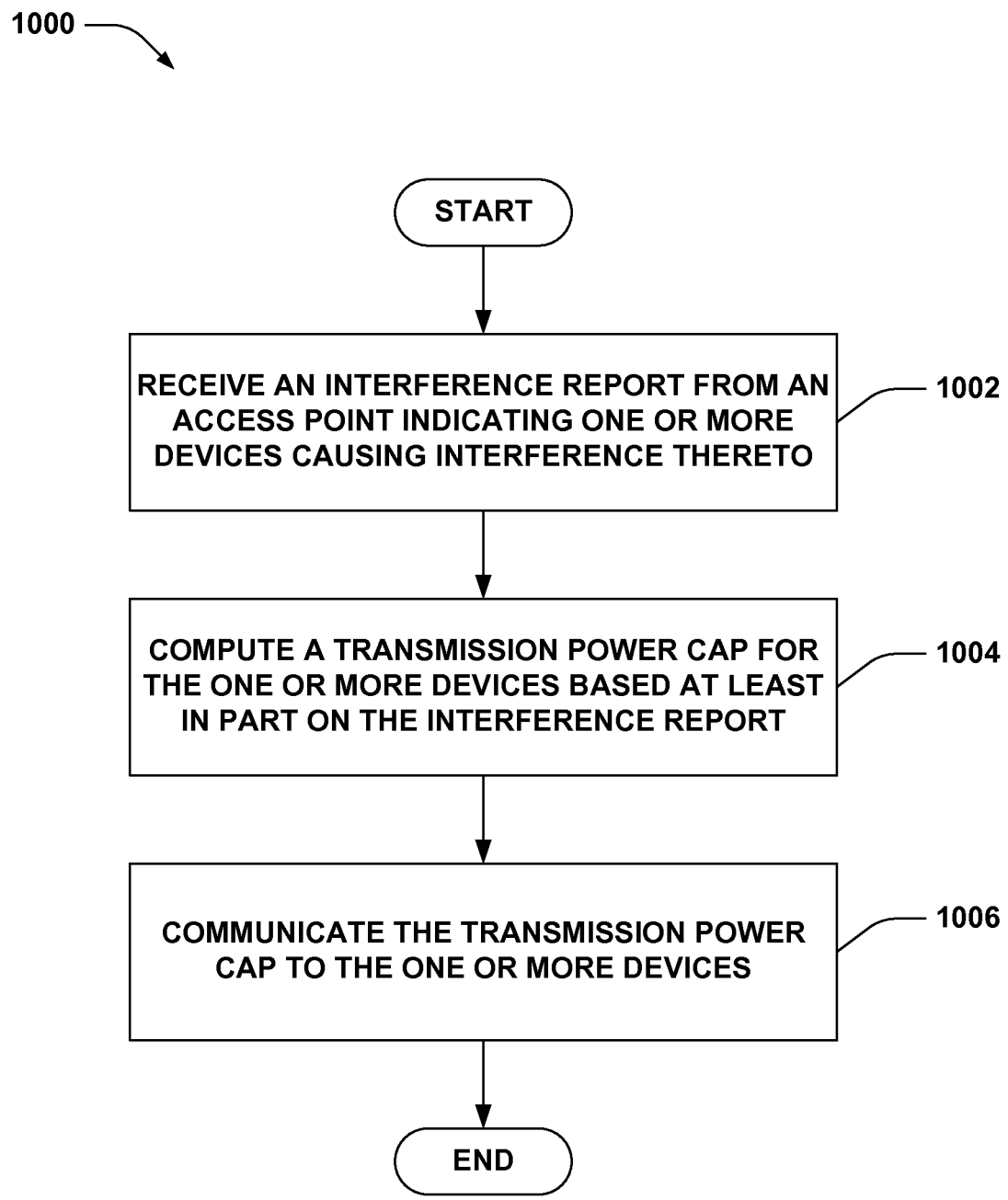
FIG. 10 is a flow chart of an aspect of an example methodology for adjusting a transmission power cap for a device based on a received interference report.

FIG. 10 depicts an example methodology 1000 for determining a transmission power cap for a device. At 1002, an interference report can be received from an access point indicating one or more devices causing interference thereto. As described, the interference report can include a total level of interference at the access point, an indication of one or more interfering devices (e.g., a threshold number or percentile of devices having the highest IoT, etc.), and/or the like. At 1004, a transmission power cap can be computed for the one or more devices based at least in part on the interference report. Thus, for example, for at least a portion of the devices indicated in the interference report, the transmission power cap can be adjusted using one or more mechanisms described above (e.g., obtain pathloss reports to the access point and accordingly adjust transmission power cap for the devices, etc.). At 1006, the transmission power cap can be communicated to the one or more devices.

Figure 11:
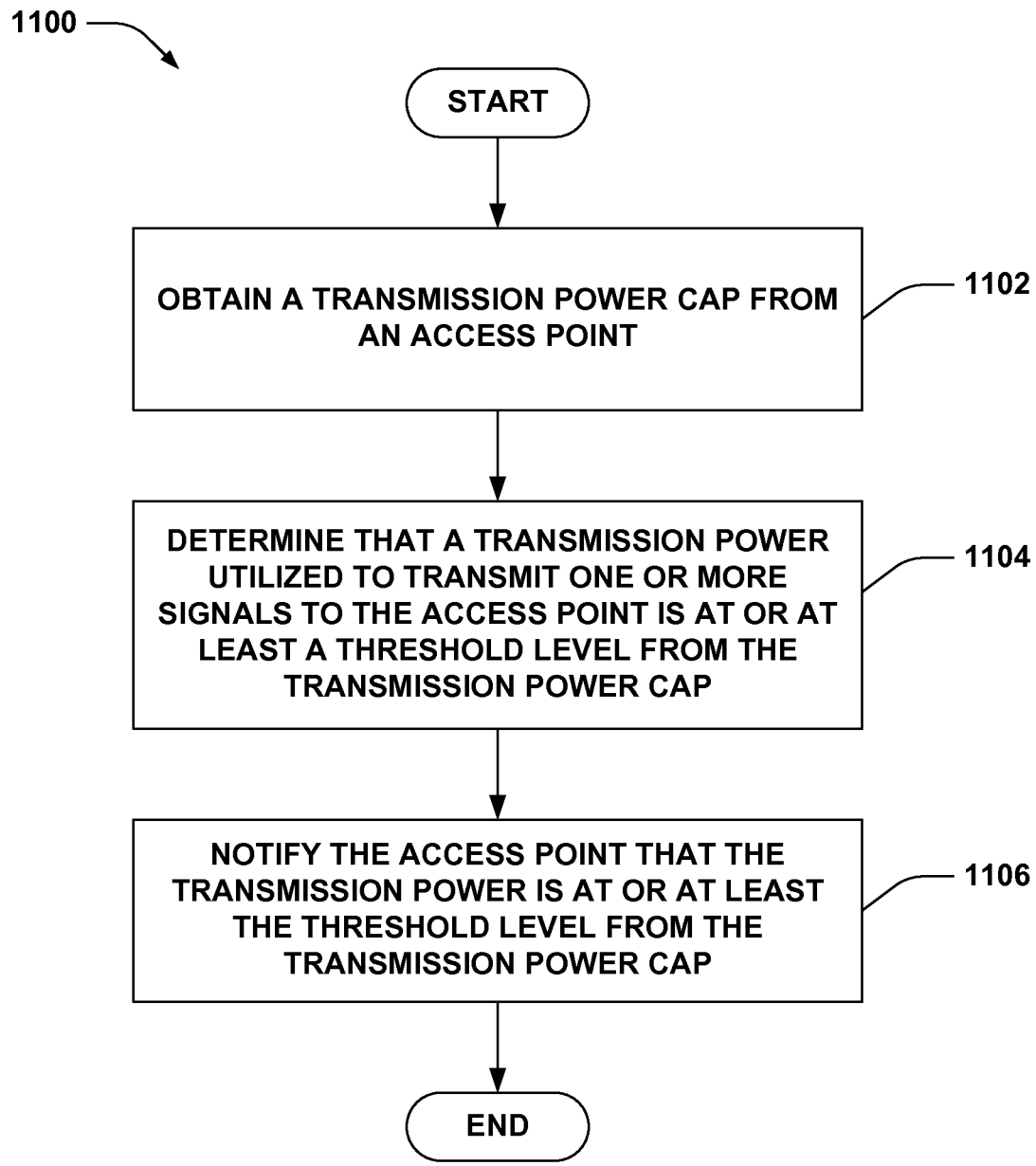
FIG. 11 is a flow chart of an aspect of an example methodology that notifies an access point of reaching or nearing a transmission power cap.

Turning to FIG. 11, an example methodology 1100 is displayed that facilitates indicating a transmission power relative to a transmission power cap. At 1102, a transmission power cap can be received from an access point. As described, this can be based at least in part on reporting pathloss measurements to the access points, etc. At 1104, it can be determined that a transmission power utilized to transmit one or more signals to the access point is at or at least a threshold level from the transmission power cap. At 1106, the access point can be notified that the transmission power is at or at least the threshold level from the transmission power cap. Thus, in an example, the access point can adjust the transmission power cap, as described previously.

It will be appreciated that, in accordance with one or more aspects described herein, inferences can be made regarding computing a transmission power cap, determining to adjust a transmission power cap, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 12:
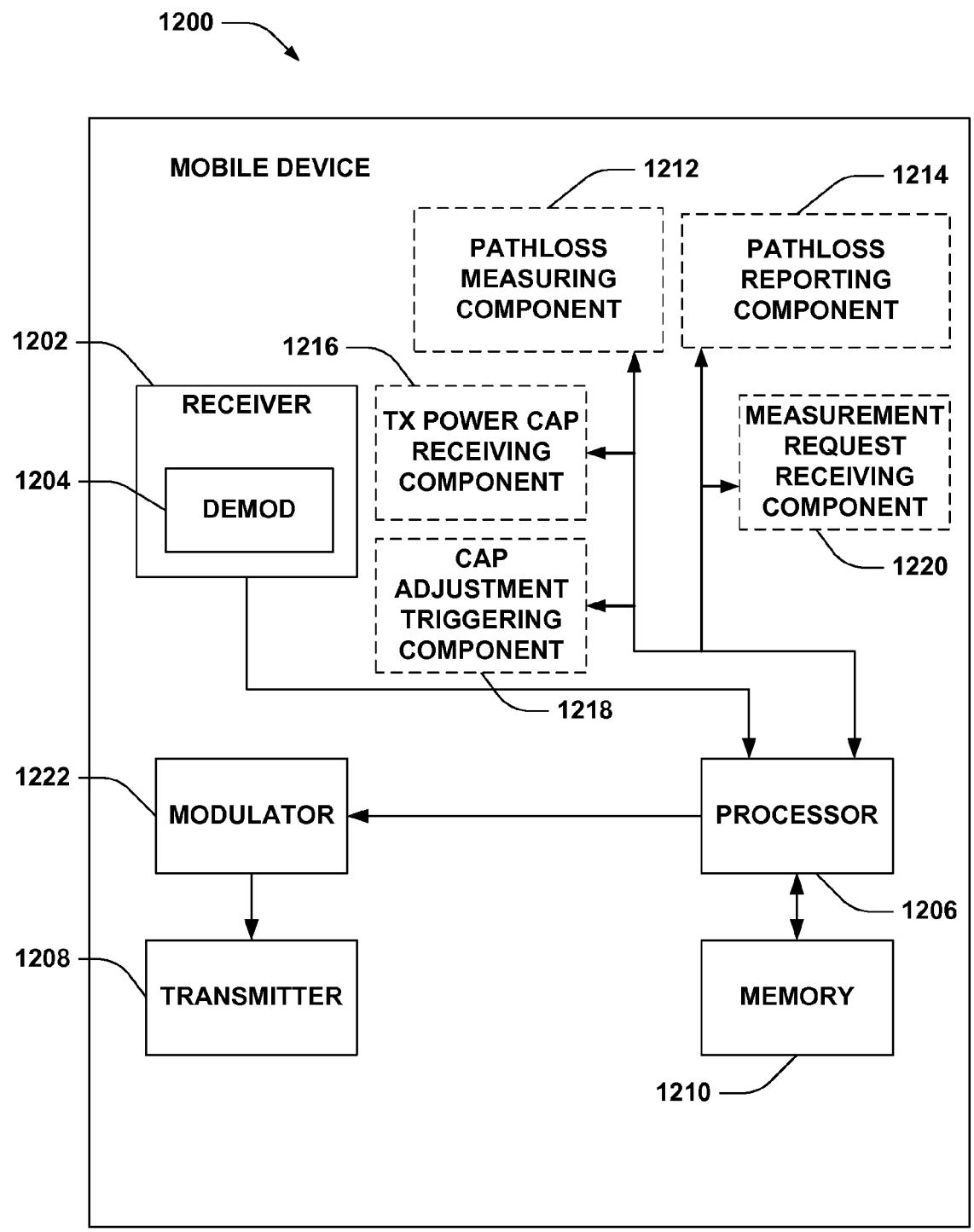
FIG. 12 is a block diagram of an example mobile device according to various aspects described herein.

FIG. 12 is an illustration of a mobile device 1200 that facilitates reporting pathloss measurements for receiving a transmission power cap. Mobile device 1200 comprises a receiver 1202 that receives a signal from, for instance, a receive antenna (not shown), performs typical actions on (e.g., filters, amplifies, downconverts, etc.) the received signal, and digitizes the conditioned signal to obtain samples. Receiver 1202 can comprise a demodulator 1204 that can demodulate received symbols and provide them to a processor 1206 for channel estimation. Processor 1206 can be a processor dedicated to analyzing information received by receiver 1202 and/or generating information for transmission by a transmitter 1208, a processor that controls one or more components of mobile device 1200, and/or a processor that both analyzes information received by receiver 1202, generates information for transmission by transmitter 1208, and controls one or more components of mobile device 1200.

Mobile device 1200 can additionally comprise memory 1210 that is operatively coupled to processor 1206 and that can store data to be transmitted, received data, information related to available channels, data associated with analyzed signal and/or interference strength, information related to an assigned channel, power, rate, or the like, and any other suitable information for estimating a channel and communicating via the channel. Memory 1210 can additionally store protocols and/or algorithms associated with estimating and/or utilizing a channel (e.g., performance based, capacity based, etc.).

It will be appreciated that the data store (e.g., memory 1210) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1210 of the subject systems and methods is intended to comprise, without being limited to, these and any other suitable types of memory.

Processor 1206 can further be optionally operatively coupled to a pathloss measuring component 1212, which can be similar to pathloss measuring component 208, a pathloss reporting component 1214, which can be similar to pathloss reporting component 210, a Tx power cap receiving component 1216, which can be similar to Tx power cap receiving component 212, a cap adjustment triggering component 1218, which can be similar to cap adjustment triggering component 306, and/or a measurement request receiving component 1220, which can be similar to measurement request receiving component 308. Mobile device 1200 still further comprises a modulator 1222 that modulates signals for transmission by transmitter 1208 to, for instance, a base station, another mobile device, etc. Moreover, for example, mobile device 1200 can comprise multiple transmitters 1208 for multiple network interfaces, as described. Although depicted as being separate from the processor 1206, it is to be appreciated that the pathloss measuring component 1212, pathloss reporting component 1214, Tx power cap receiving component 1216, cap adjustment triggering component 1218, measurement request receiving component 1220, demodulator 1204, and/or modulator 1222 can be part of the processor 1206 or multiple processors (not shown).

Figure 13:
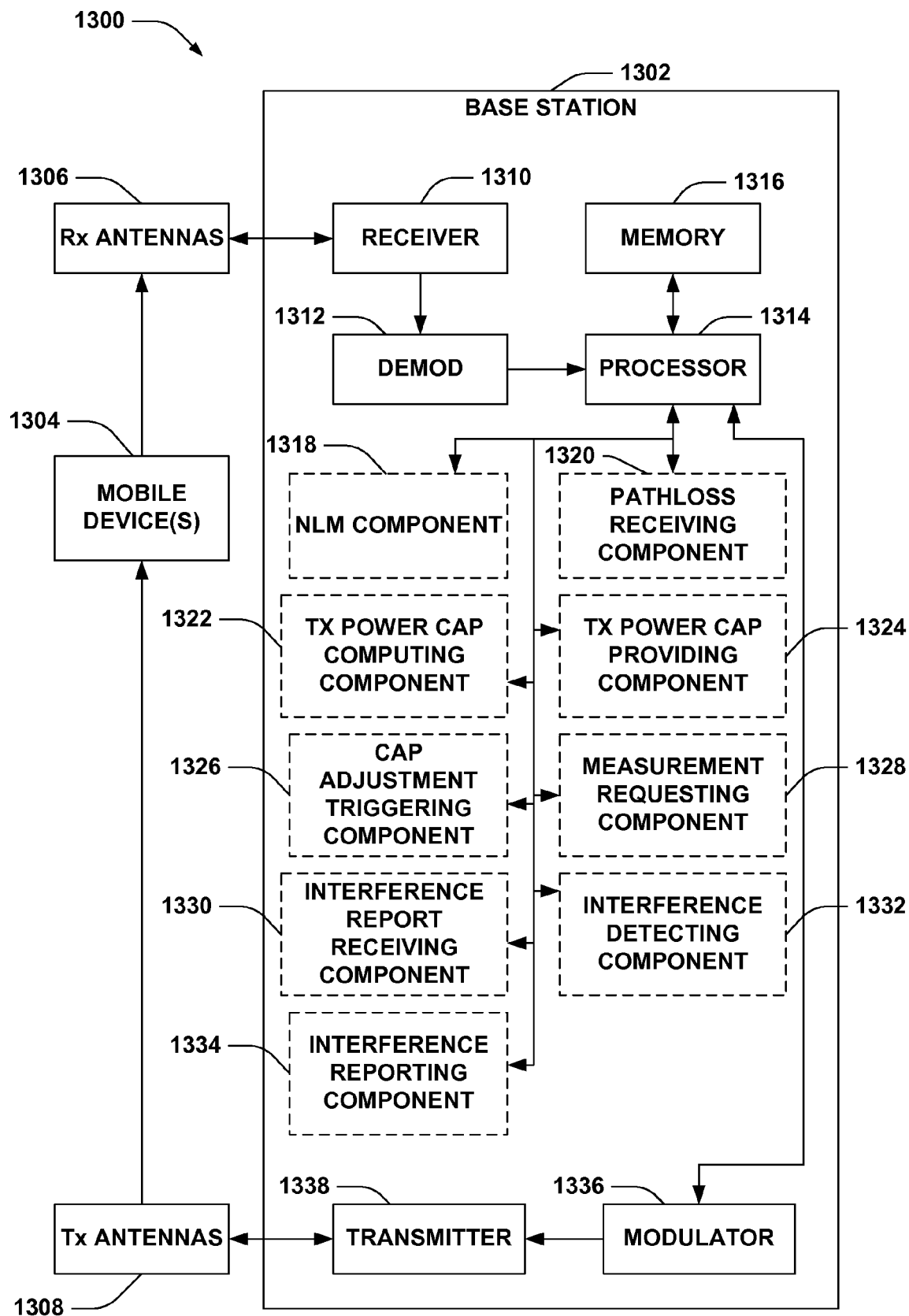
FIG. 13 is a block diagram of an example system for facilitating determining a transmission power cap.

FIG. 13 is an illustration of a system 1300 that facilitates communicating with one or more devices using wireless communications. System 1300 comprises a base station 1302, which can be substantially any base station (e.g., a small base station, such as a femtocell, picocell, etc., mobile base station . . . ), a relay, etc., having a receiver 1310 that receives signal(s) from one or more mobile devices 1304 through a plurality of receive antennas 1306 (e.g., which can be of multiple network technologies, as described), and a transmitter 1338 that transmits to the one or more mobile devices 1304 through a plurality of transmit antennas 1308 (e.g., which can be of multiple network technologies, as described). In addition, in one example, transmitter 1338 can transmit to the mobile devices 1304 over a wired front link. Receiver 1310 can receive information from one or more receive antennas 1306 and is operatively associated with a demodulator 1312 that demodulates received information. In addition, in an example, receiver 1310 can receive from a wired backhaul link. Demodulated symbols are analyzed by a processor 1314 that can be similar to the processor described above with regard to FIG. 12, and which is coupled to a memory 1316 that stores information related to estimating a signal (e.g., pilot) strength and/or interference strength, data to be transmitted to or received from mobile device(s) 1304 (or a disparate base station (not shown)), and/or any other suitable information related to performing the various actions and functions set forth herein.

Processor 1314 is further optionally coupled to a NLM component 1318, which can be similar to NLM component 310, a pathloss receiving component 1320, which can be similar to pathloss receiving components 214 and/or 312, a Tx power cap computing component 1322, which can be similar to Tx power cap computing components 216 and/or 314, and/or a Tx power cap providing component 1324, which can be similar to Tx power cap providing components 218 and/or 316. Processor 1314 can further be optionally coupled to a cap adjustment triggering component 1326, which can be similar to cap adjustment triggering component 318, and/or a measurement requesting component 1328, which can be similar to measurement requesting component 320. Moreover, for example, processor 1314 can also optionally be coupled to an interference report receiving component 1330, which can be similar to interference report receiving component 408, an interference detecting component 1332, which can be similar to interference detecting component 410, and/or an interference reporting component 1334, which can be similar to interference reporting component 412.

Moreover, for example, processor 1314 can modulate signals to be transmitted using modulator 1336, and transmit modulated signals using transmitter 1338. Transmitter 1338 can transmit signals to mobile devices 1304 over Tx antennas 1308. Furthermore, although depicted as being separate from the processor 1314, it is to be appreciated that the NLM component 1318, pathloss receiving component 1320, Tx power cap computing component 1322, Tx power cap providing component 1324, cap adjustment triggering component 1326, measurement requesting component 1328, interference report receiving component 1330, interference detecting component 1332, interference reporting component 1334, demodulator 1312, and/or modulator 1336 can be part of the processor 1314 or multiple processors (not shown), and/or stored as instructions in memory 1316 for execution by processor 1314.

Figure 14:
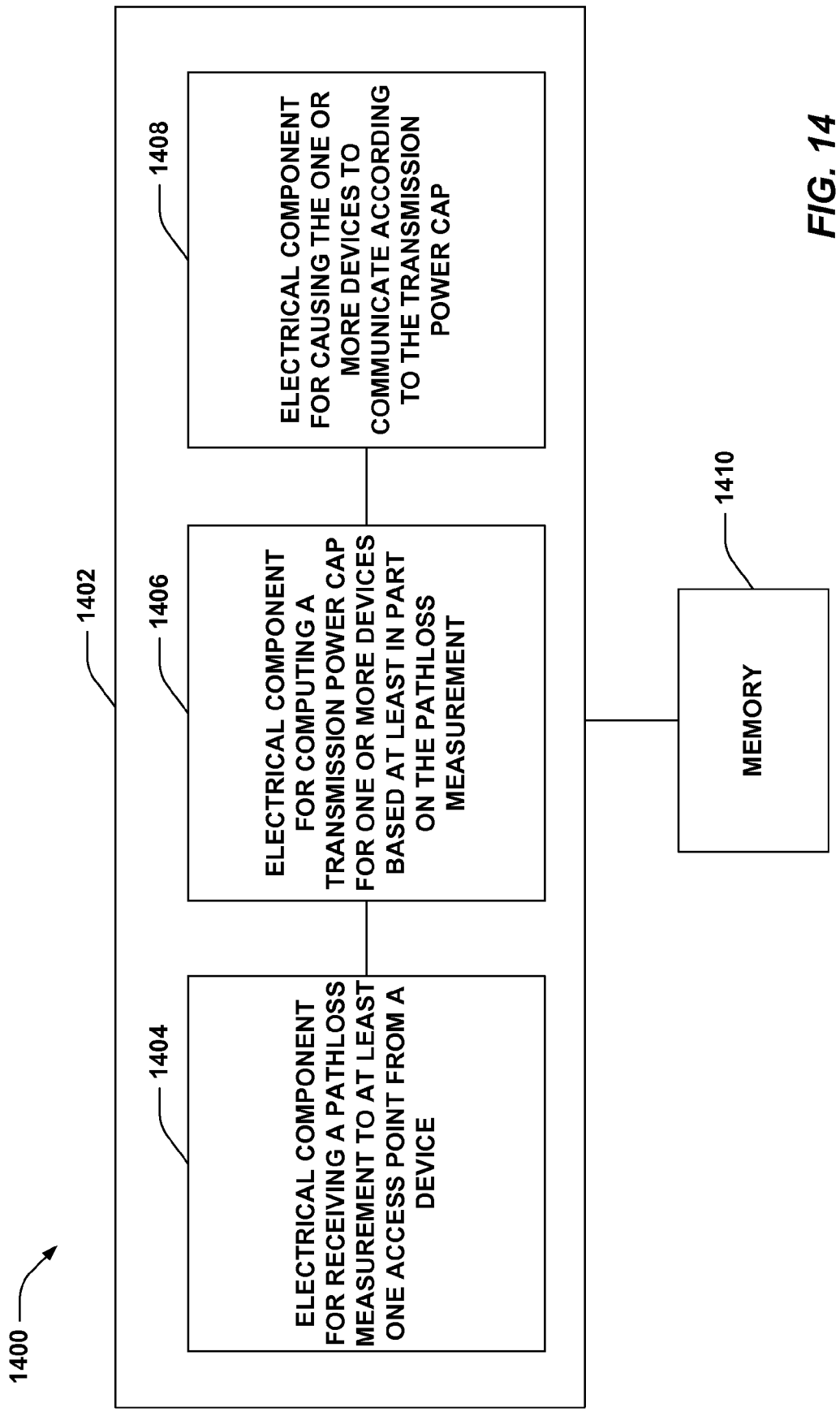
FIG. 14 is a block diagram of an example system that determines a transmission power cap for a device.

With reference to FIG. 14, illustrated is a system 1400 for determining a transmission power cap for a device. For example, system 1400 can reside at least partially within an access point, etc. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for receiving a pathloss measurement to at least one access point from a device 1404. For example, the pathloss measurements can be received based at least in part on a request, in one example, and/or can be received with pathloss measurements from other devices to the same or other access points, etc. Further, logical grouping 1402 can comprise an electrical component for computing a transmission power cap for one or more devices based at least in part on the pathloss measurement 1406.

As described, for example, electrical component 1406 can compute the transmission power cap further based on a noise floor, power capping threshold, etc. In addition, in one example, the transmission power cap can be specific to the device, common for the one or more devices, and/or the like. In addition, as described, computing the transmission power cap can include a adjusting a transmission power cap for the device based on one or more triggers or other events. Additionally, logical grouping 1402 can comprise an electrical component for causing the one or more devices to communicate according to the transmission power cap 1408. For example, electrical component 1404 can include pathloss receiving components 214 and/or 312, and/or pathloss measuring component 208, as described above. In addition, for example, electrical component 1406, in an aspect, can include a Tx power cap computing component 216 and/or 314, as described above. Moreover, electrical component 1408 can include a Tx power cap providing component 218 and/or 316, and/or a Tx power cap receiving component 212, as described.

Additionally, system 1400 can include a memory 1410 that retains instructions for executing functions associated with the electrical components 1404, 1406, and 1408. While shown as being external to memory 1410, it is to be understood that one or more of the electrical components 1404, 1406, and 1408 can exist within memory 1410. In one example, electrical components 1404, 1406, and 1408 can comprise at least one processor, or each electrical component 1404, 1406, and 1408 can be a corresponding module of at least one processor. Moreover, in an additional or alternative example, electrical components 1404, 1406, and 1408 can be a computer program product comprising a computer readable medium, where each electrical component 1404, 1406, and 1408 can be corresponding code.

Figure 15:
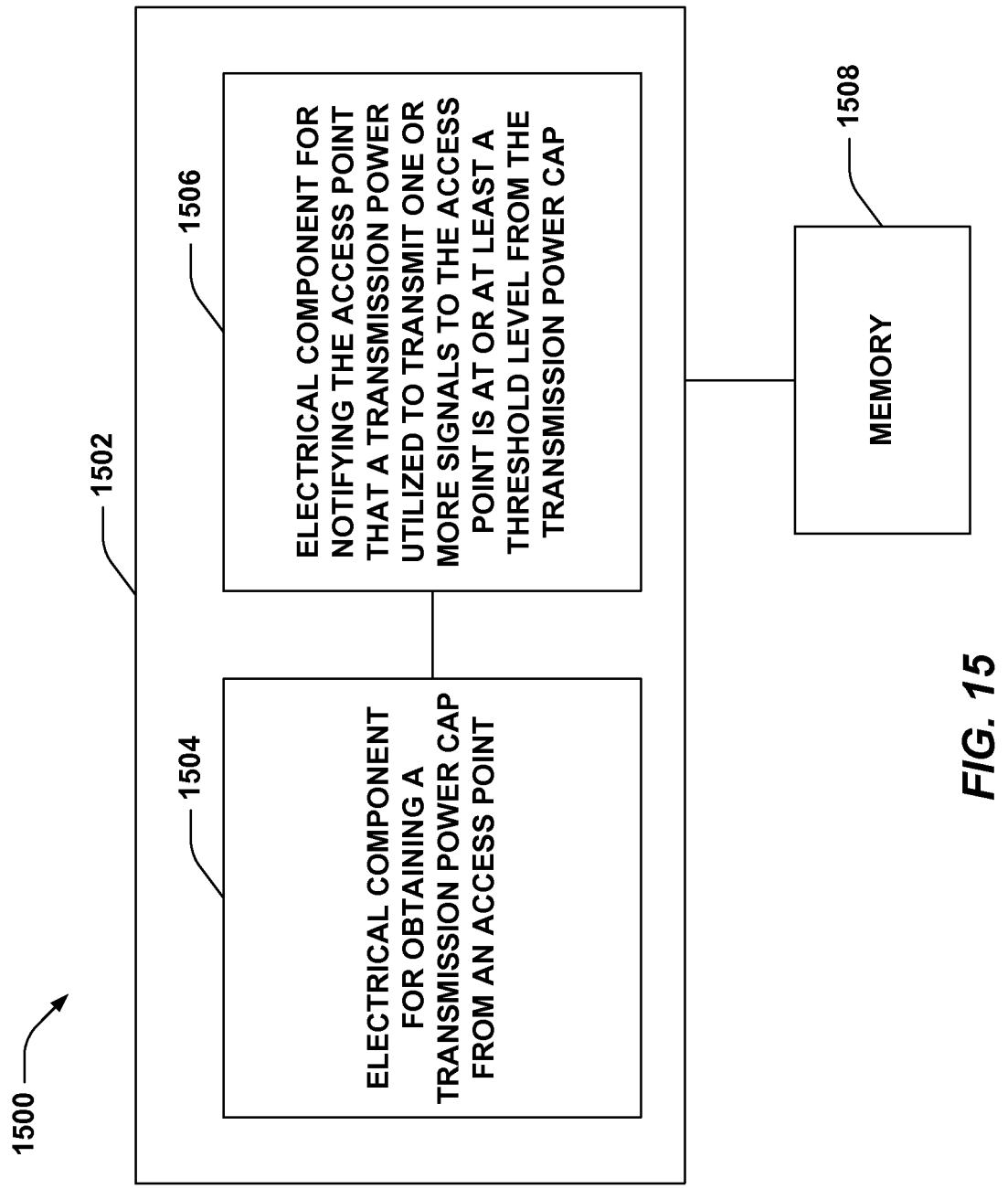
FIG. 15 is a block diagram of an example system that notifies an access point of reaching or nearing a transmission power cap.

With reference to FIG. 15, illustrated is a system 1500 that notifies an access point when a transmission power is at or nearing a transmission power cap. For example, system 1500 can reside at least partially within a device, etc. It is to be appreciated that system 1500 is represented as including functional blocks, which can be functional blocks that represent functions implemented by a processor, software, or combination thereof (e.g., firmware). System 1500 includes a logical grouping 1502 of electrical components that can act in conjunction. For instance, logical grouping 1502 can include an electrical component for obtaining a transmission power cap from an access point 1504. As described, for example, the transmission power cap can be received based on pathloss measurements communicated to the access point (e.g., of the access point or surrounding access points). Moreover, for example, the transmission power cap can be a common transmission power cap computed for substantially all devices communicating with the access point.

Further, logical grouping 1502 can comprise an electrical component for notifying the access point that a transmission power utilized to transmit one or more signals to the access point is at or at least a threshold level from the transmission power cap 1506. As described for example, an adjusted transmission power cap can be received based at least in part on the notification. For example, electrical component 1504 can include a Tx power cap receiving component 212, as described above. In addition, for example, electrical component 1506, in an aspect, can include a cap adjustment triggering component 306, as described above.

Additionally, system 1500 can include a memory 1508 that retains instructions for executing functions associated with the electrical components 1504 and 1506. While shown as being external to memory 1508, it is to be understood that one or more of the electrical components 1504 and 1506 can exist within memory 1508. In one example, electrical components 1504 and 1506 can comprise at least one processor, or each electrical component 1504 and 1506 can be a corresponding module of at least one processor. Moreover, in an additional or alternative example, electrical components 1504 and 1506 can be a computer program product comprising a computer readable medium, where each electrical component 1504 and 1506 can be corresponding code.

Figure 16:
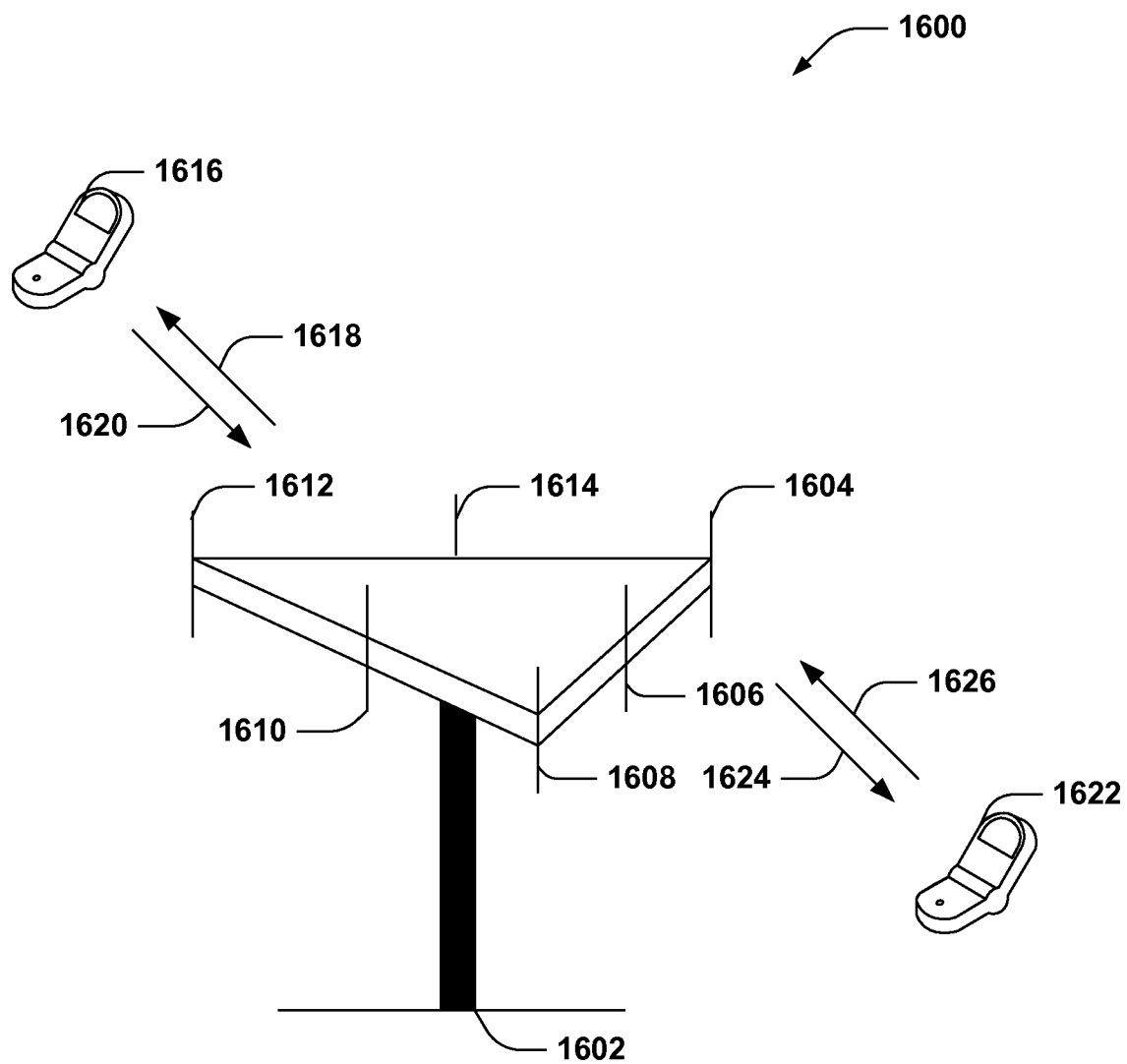
FIG. 16 is a block diagram of an example wireless communication system in accordance with various aspects set forth herein.

Referring now to FIG. 16, a wireless communication system 1600 is illustrated in accordance with various embodiments presented herein. System 1600 comprises a base station 1602 that can include multiple antenna groups. For example, one antenna group can include antennas 1604 and 1606, another group can comprise antennas 1608 and 1610, and an additional group can include antennas 1612 and 1614. Two antennas are illustrated for each antenna group; however, more or fewer antennas can be utilized for each group. Base station 1602 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 1602 can communicate with one or more mobile devices such as mobile device 1616 and mobile device 1622; however, it is to be appreciated that base station 1602 can communicate with substantially any number of mobile devices similar to mobile devices 1616 and 1622. Mobile devices 1616 and 1622 can be, for example, cellular phones, smart phones, laptops, handheld communication devices, handheld computing devices, satellite radios, global positioning systems, PDAs, and/or any other suitable device for communicating over wireless communication system 1600. As depicted, mobile device 1616 is in communication with antennas 1612 and 1614, where antennas 1612 and 1614 transmit information to mobile device 1616 over a forward link 1618 and receive information from mobile device 1616 over a reverse link 1620. Moreover, mobile device 1622 is in communication with antennas 1604 and 1606, where antennas 1604 and 1606 transmit information to mobile device 1622 over a forward link 1624 and receive information from mobile device 1622 over a reverse link 1626. In a frequency division duplex (FDD) system, forward link 1618 can utilize a different frequency band than that used by reverse link 1620, and forward link 1624 can employ a different frequency band than that employed by reverse link 1626, for example. Further, in a time division duplex (TDD) system, forward link 1618 and reverse link 1620 can utilize a common frequency band and forward link 1624 and reverse link 1626 can utilize a common frequency band.

Each group of antennas and/or the area in which they are designated to communicate can be referred to as a sector of base station 1602. For example, antenna groups can be designed to communicate to mobile devices in a sector of the areas covered by base station 1602. In communication over forward links 1618 and 1624, the transmitting antennas of base station 1602 can utilize beamforming to improve signal-to-noise ratio of forward links 1618 and 1624 for mobile devices 1616 and 1622. Also, while base station 1602 utilizes beamforming to transmit to mobile devices 1616 and 1622 scattered randomly through an associated coverage, mobile devices in neighboring cells can be subject to less interference as compared to a base station transmitting through a single antenna to all its mobile devices. Moreover, mobile devices 1616 and 1622 can communicate directly with one another using a peer-to-peer or ad hoc technology as depicted. According to an example, system 1600 can be a multiple-input multiple-output (MIMO) communication system. In addition, for example, base station 1602 can set a transmission power cap for device 1616 and/or 1622 based on one or more pathloss measurements to one or more access points, as described.

Figure 17:
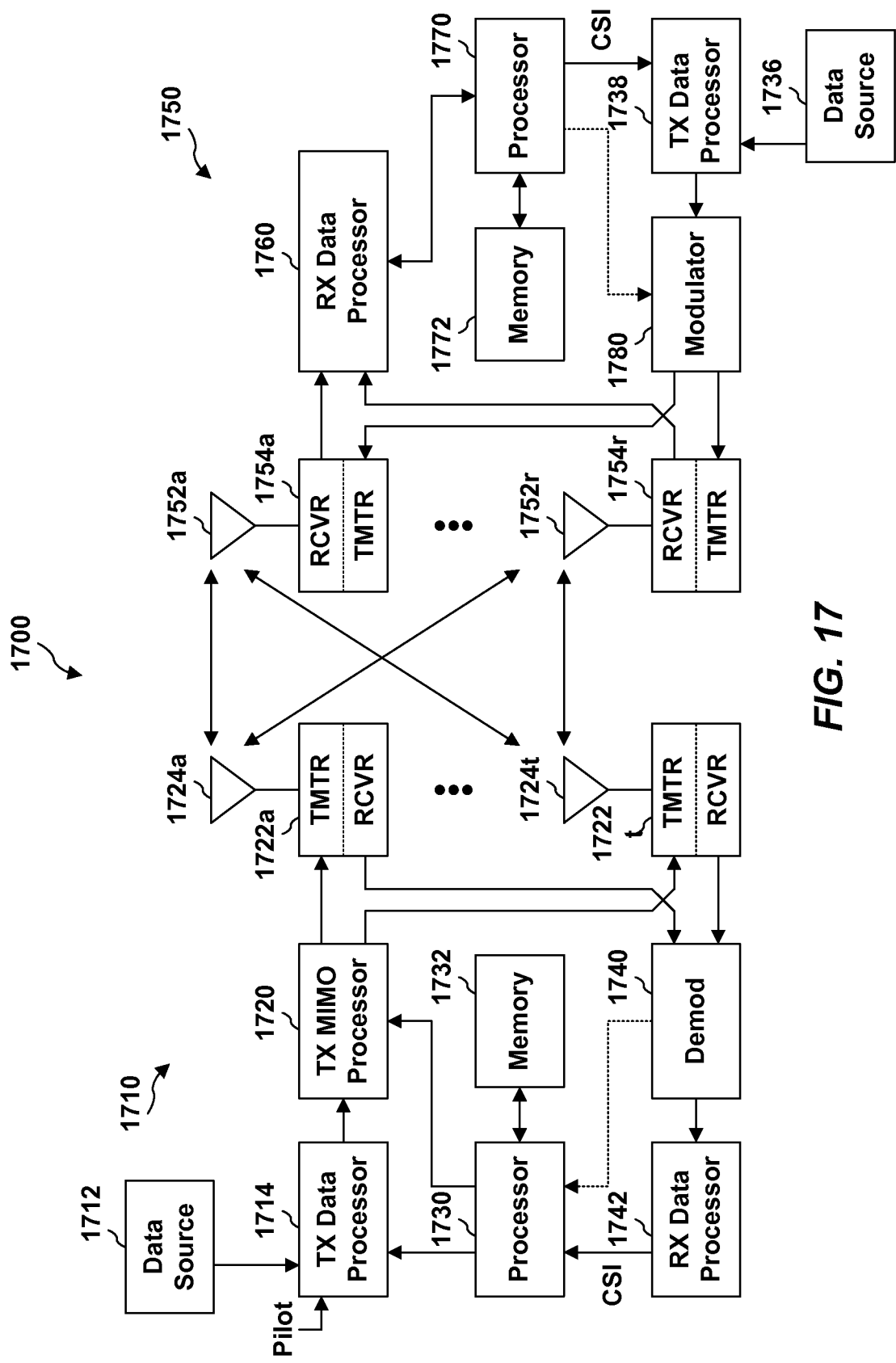
FIG. 17 is an illustration of an example wireless network environment that can be employed in conjunction with the various systems and methods described herein.

FIG. 17 shows an example wireless communication system 1700. The wireless communication system 1700 depicts one base station 1710 and one mobile device 1750 for sake of brevity. However, it is to be appreciated that system 1700 can include more than one base station and/or more than one mobile device, wherein additional base stations and/or mobile devices can be substantially similar or different from example base station 1710 and mobile device 1750 described below. In addition, it is to be appreciated that base station 1710 and/or mobile device 1750 can employ the systems (FIGS. 1-4 and 13-16), mobile devices, (FIG. 12), and/or methods (FIGS. 5-11) described herein to facilitate wireless communication there between. For example, components or functions of the systems and/or methods described herein can be part of a memory 1732 and/or 1772 or processors 1730 and/or 1770 described below, and/or can be executed by processors 1730 and/or 1770 to perform the disclosed functions.

At base station 1710, traffic data for a number of data streams is provided from a data source 1712 to a transmit (TX) data processor 1714. According to an example, each data stream can be transmitted over a respective antenna. TX data processor 1714 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1750 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1730.

The modulation symbols for the data streams can be provided to a TX MIMO processor 1720, which can further process the modulation symbols (e.g., for OFDM). TX MIMO processor 1720 then provides $N_T$ modulation symbol streams to $N_T$ transmitters (TMTR) 1722a through 1722t. In various embodiments, TX MIMO processor 1720 applies beamforming weights to the symbols of the data streams and to the antenna from which the symbol is being transmitted.

Each transmitter 1722 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1722a through 1722t are transmitted from $N_T$ antennas 1724a through 1724t, respectively.

At mobile device 1750, the transmitted modulated signals are received by $N_R$ antennas 1752a through 1752r and the received signal from each antenna 1752 is provided to a respective receiver (RCVR) 1754a through 1754r. Each receiver 1754 conditions (e.g., filters, amplifies, and downconverts) a respective signal, digitizes the conditioned signal to provide samples, and further processes the samples to provide a corresponding "received" symbol stream.

An RX data processor 1760 can receive and process the $N_R$ received symbol streams from $N_R$ receivers 1754 based on a particular receiver processing technique to provide $N_T$ "detected" symbol streams. RX data processor 1760 can demodulate, deinterleave, and decode each detected symbol stream to recover the traffic data for the data stream. The processing by RX data processor 1760 is complementary to that performed by TX MIMO processor 1720 and TX data processor 1714 at base station 1710.

The reverse link message can comprise various types of information regarding the communication link and/or the received data stream. The reverse link message can be processed by a TX data processor 1738, which also receives traffic data for a number of data streams from a data source 1736, modulated by a modulator 1780, conditioned by transmitters 1754a through 1754r, and transmitted back to base station 1710.

At base station 1710, the modulated signals from mobile device 1750 are received by antennas 1724, conditioned by receivers 1722, demodulated by a demodulator 1740, and processed by a RX data processor 1742 to extract the reverse link message transmitted by mobile device 1750. Further, processor 1730 can process the extracted message to determine which precoding matrix to use for determining the beamforming weights.

Processors 1730 and 1770 can direct (e.g., control, coordinate, manage, etc.) operation at base station 1710 and mobile device 1750, respectively. Respective processors 1730 and 1770 can be associated with memory 1732 and 1772 that store program codes and data. Processors 1730 and 1770 can determine transmission power caps, determine that a trigger or event for adjusting the transmission power cap has occurred, and/or the like, as described.

Figure 18:
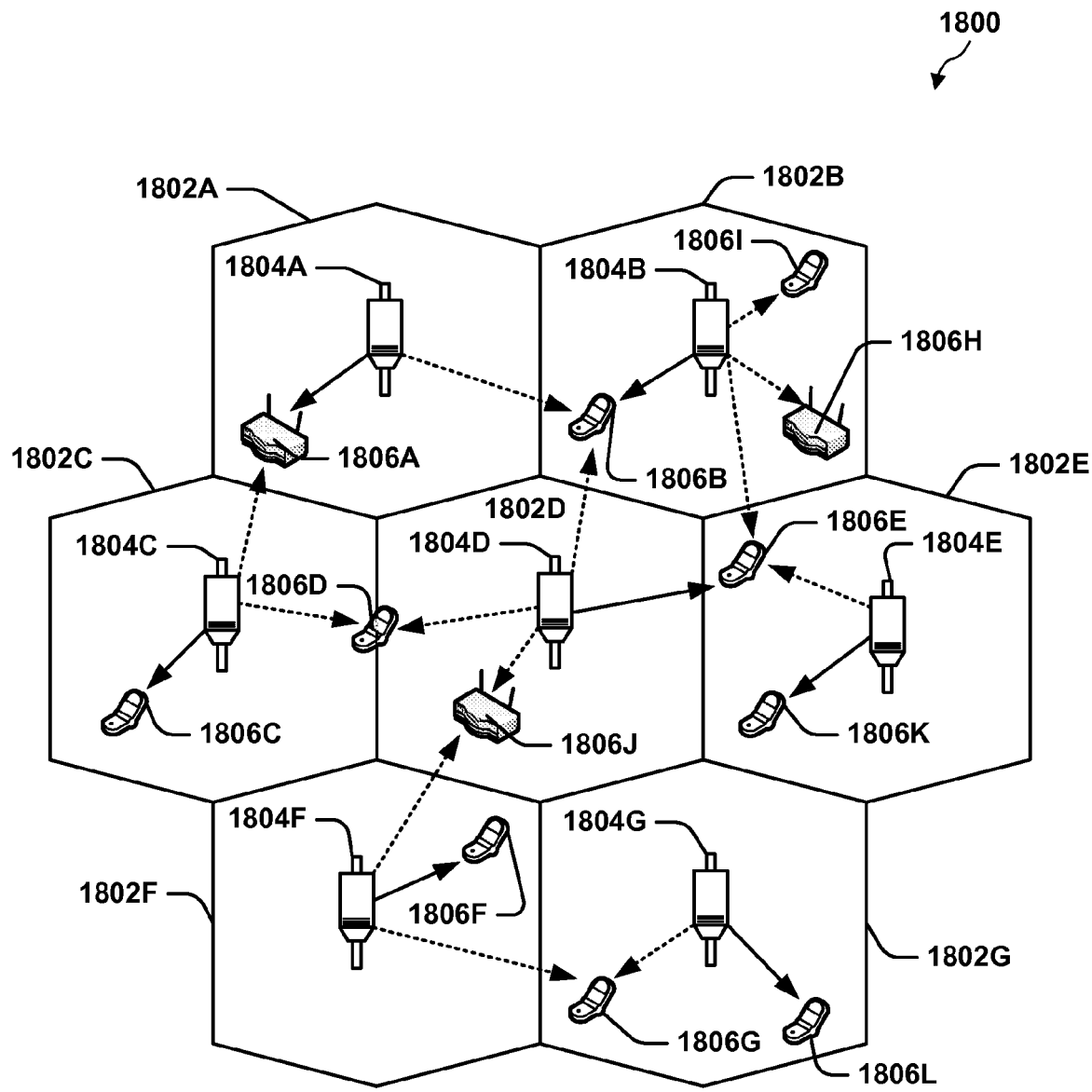
FIG. 18 illustrates an example wireless communication system, configured to support a number of devices, in which the aspects herein can be implemented.

FIG. 18 illustrates a wireless communication system 1800, configured to support a number of users, in which the teachings herein may be implemented. The system 1800 provides communication for multiple cells 1802, such as, for example, macro cells 1802A-1802G, with each cell being serviced by a corresponding access node 1804 (e.g., access nodes 1804A-1804G). As shown in FIG. 18, access terminals 1806 (e.g., access terminals 1806A-1806L) can be dispersed at various locations throughout the system over time. Each access terminal 1806 can communicate with one or more access nodes 1804 on a forward link (FL) and/or a reverse link (RL) at a given moment, depending upon whether the access terminal 1806 is active and whether it is in soft handoff, for example. The wireless communication system 1800 can provide service over a large geographic region.

Figure 19:
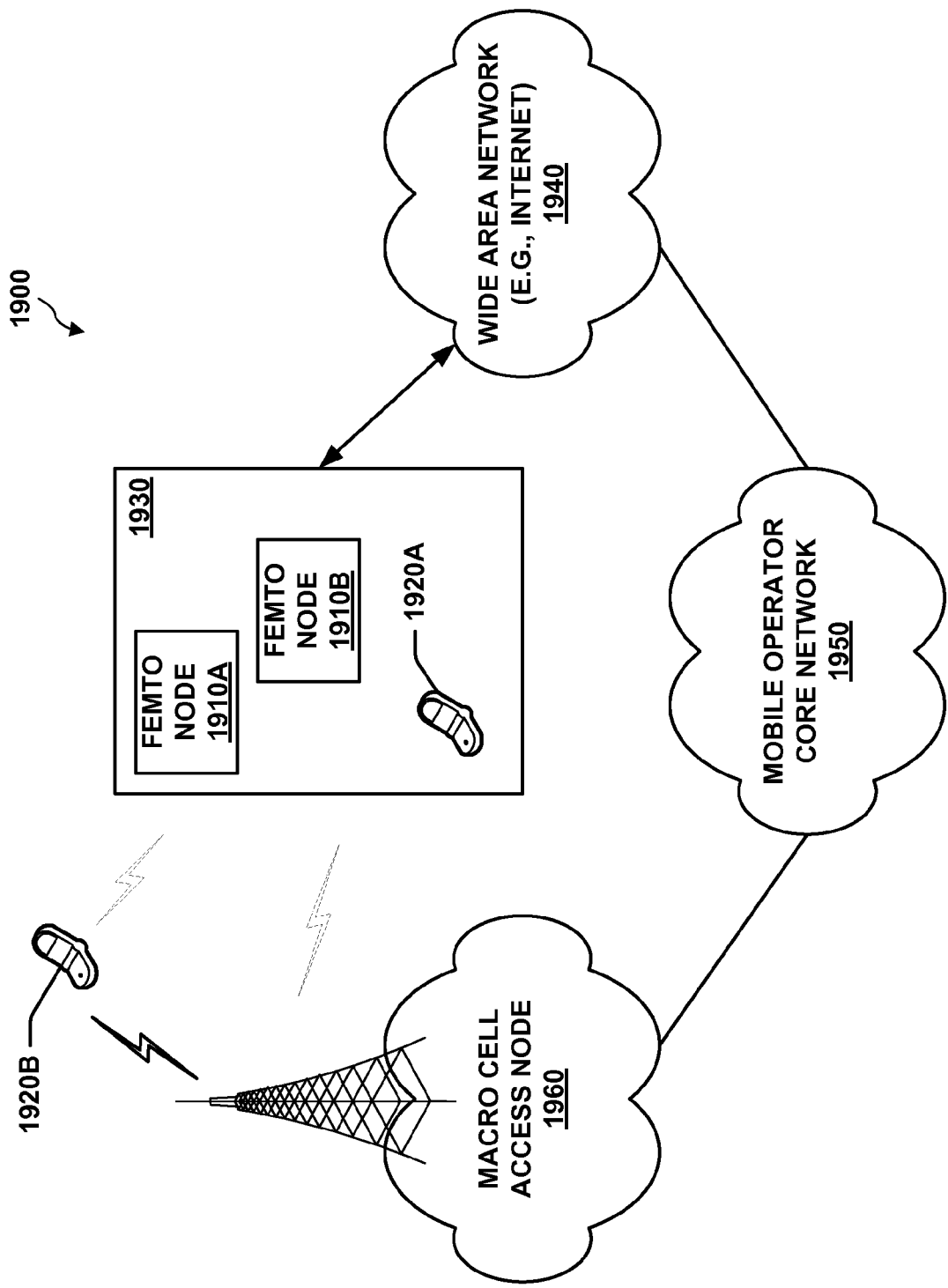
FIG. 19 is an illustration of an exemplary communication system to enable deployment of femtocells within a network environment.

FIG. 19 illustrates an exemplary communication system 1900 where one or more femto nodes are deployed within a network environment. Specifically, the system 1900 includes multiple femto nodes 1910A and 1910B (e.g., femtocell nodes or H(e)NB) installed in a relatively small scale network environment (e.g., in one or more user residences 1930). Each femto node 1910 can be coupled to a wide area network 1940 (e.g., the Internet) and a mobile operator core network 1950 via a digital subscriber line (DSL) router, a cable modem, a wireless link, or other connectivity means (not shown). As will be discussed below, each femto node 1910 can be configured to serve associated access terminals 1920 (e.g., access terminal 1920A) and, optionally, alien access terminals 1920 (e.g., access terminal 1920B). In other words, access to femto nodes 1910 can be restricted such that a given access terminal 1920 can be served by a set of designated (e.g., home) femto node(s) 1910 but may not be served by any non-designated femto nodes 1910 (e.g., a neighbor's femto node).

Figure 20:
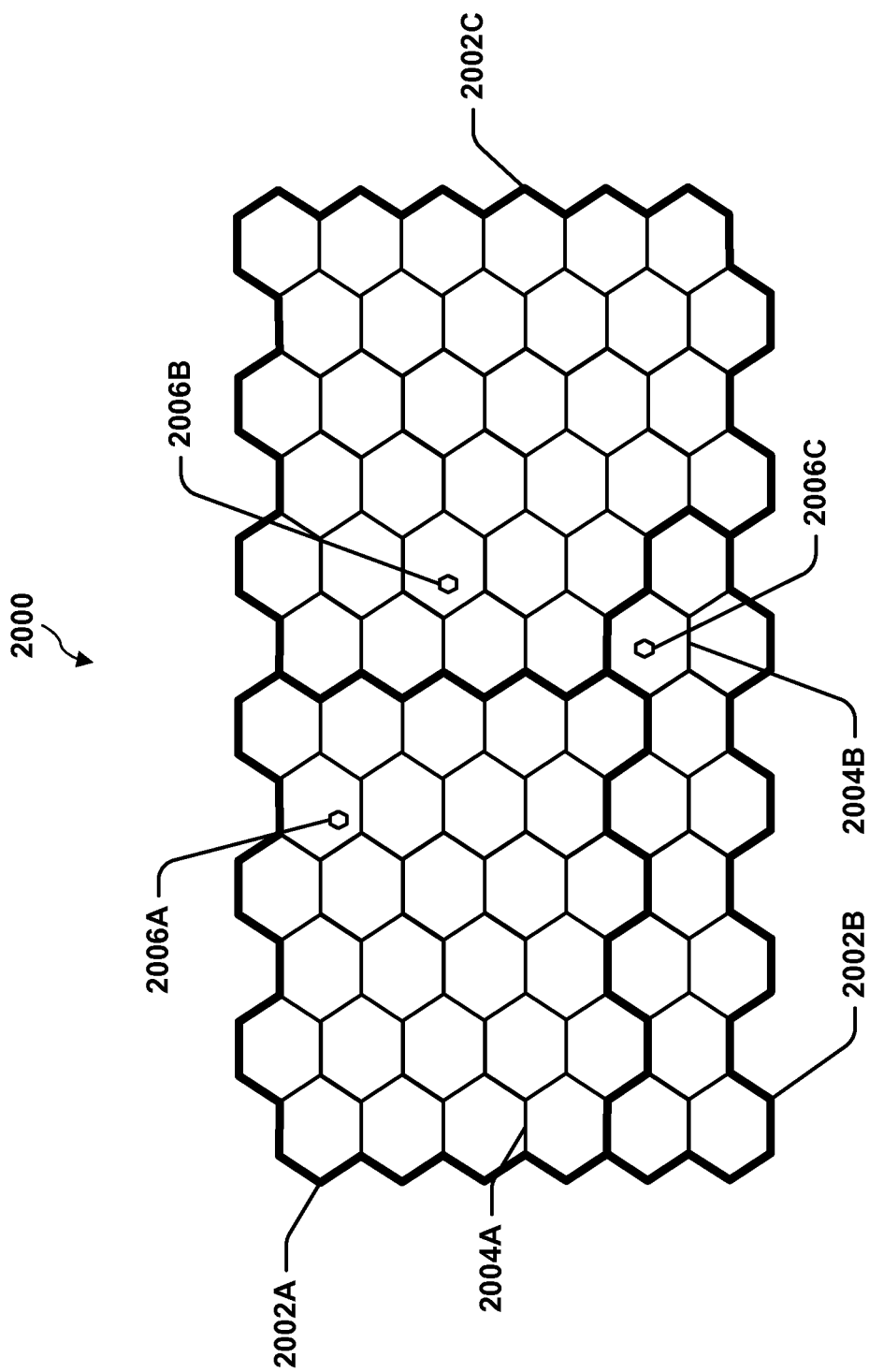
FIG. 20 illustrates an example of a coverage map having several defined tracking areas.

FIG. 20 illustrates an example of a coverage map 2000 where several tracking areas 2002 (or routing areas or location areas) are defined, each of which includes several macro coverage areas 2004. Here, areas of coverage associated with tracking areas 2002A, 2002B, and 2002C are delineated by the wide lines and the macro coverage areas 2004 are represented by the hexagons. The tracking areas 2002 also include femto coverage areas 2006. In this example, each of the femto coverage areas 2006 (e.g., femto coverage area 2006C) is depicted within a macro coverage area 2004 (e.g., macro coverage area 2004B). It should be appreciated, however, that a femto coverage area 2006 may not lie entirely within a macro coverage area 2004. In practice, a large number of femto coverage areas 2006 can be defined with a given tracking area 2002 or macro coverage area 2004. Also, one or more pico coverage areas (not shown) can be defined within a given tracking area 2002 or macro coverage area 2004.

Referring again to FIG. 19, the owner of a femto node 1910 can subscribe to mobile service, such as, for example, 3G mobile service, offered through the mobile operator core network 1950. In addition, an access terminal 1920 can be capable of operating both in macro environments and in smaller scale (e.g., residential) network environments. Thus, for example, depending on the current location of the access terminal 1920, the access terminal 1920 can be served by an access node 1960 or by any one of a set of femto nodes 1910 (e.g., the femto nodes 1910A and 1910B that reside within a corresponding user residence 1930). For example, when a subscriber is outside his home, he is served by a standard macro cell access node (e.g., node 1960) and when the subscriber is at home, he is served by a femto node (e.g., node 1910A). Here, it should be appreciated that a femto node 1910 can be backward compatible with existing access terminals 1920.

A femto node 1910 can be deployed on a single frequency or, in the alternative, on multiple frequencies. Depending on the particular configuration, the single frequency or one or more of the multiple frequencies can overlap with one or more frequencies used by a macro cell access node (e.g., node 1960). In some aspects, an access terminal 1920 can be configured to connect to a preferred femto node (e.g., the home femto node of the access terminal 1920) whenever such connectivity is possible. For example, whenever the access terminal 1920 is within the user's residence 1930, it can communicate with the home femto node 1910.

In some aspects, if the access terminal 1920 operates within the mobile operator core network 1950 but is not residing on its most preferred network (e.g., as defined in a preferred roaming list), the access terminal 1920 can continue to search for the most preferred network (e.g., femto node 1910) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 1920 can limit the search for specific band and channel. For example, the search for the most preferred system can be repeated periodically. Upon discovery of a preferred femto node, such as femto node 1910, the access terminal 1920 selects the femto node 1910 for camping within its coverage area.

A femto node can be restricted in some aspects. For example, a given femto node can only provide certain services to certain access terminals. In deployments with so-called restricted (or closed) association, a given access terminal can only be served by the macro cell mobile network and a defined set of femto nodes (e.g., the femto nodes 1910 that reside within the corresponding user residence 1930). In some implementations, a femto node can be restricted to not provide, for at least one access terminal, at least one of: signaling, data access, registration, paging, or service.

In some aspects, a restricted femto node (which can also be referred to as a Closed Subscriber Group H(e)NB) is one that provides service to a restricted provisioned set of access terminals. This set can be temporarily or permanently extended as necessary. In some aspects, a Closed Subscriber Group (CSG) can be defined as the set of access nodes (e.g., femto nodes) that share a common access control list of access terminals. A channel on which all femto nodes (or all restricted femto nodes) in a region operate can be referred to as a femto channel.

Various relationships can thus exist between a given femto node and a given access terminal. For example, from the perspective of an access terminal, an open femto node can refer to a femto node with no restricted association. A restricted femto node can refer to a femto node that is restricted in some manner (e.g., restricted for association and/or registration). A home femto node can refer to a femto node on which the access terminal is authorized to access and operate on. A guest femto node can refer to a femto node on which an access terminal is temporarily authorized to access or operate on. An alien femto node can refer to a femto node on which the access terminal is not authorized to access or operate on, except for perhaps emergency situations (e.g., 911 calls).

From a restricted femto node perspective, a home access terminal can refer to an access terminal that authorized to access the restricted femto node. A guest access terminal can refer to an access terminal with temporary access to the restricted femto node. An alien access terminal can refer to an access terminal that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given access terminal, and so on.

A wireless multiple-access communication system can simultaneously support communication for multiple wireless access terminals. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for determining a transmission power cap for a device to mitigate interference at least at an access point, comprising:
   receiving a pathloss measurement to at least one access point from a device;
   computing a transmission power cap for a plurality of devices based at least in part on the pathloss measurement, wherein the transmission power cap is common for the plurality of devices;
   causing the plurality of devices to communicate according to the transmission power cap; and
   adjusting the transmission power cap for an individual device of the plurality of devices based at least in part on determining a device transmission power is at or a threshold level from the transmission power cap, or on determining a received power of one or more signals from the individual device is at or exceeds a received power threshold.

2. The method of claim 1, wherein the computing the transmission power cap is further based on other pathloss measurements to the at least one access point or other access points received from the device or at least a portion of the plurality of devices.

3. The method of claim 2, wherein the computing the transmission power cap comprises determining a minimum of one or more reference transmission powers computed for the at least one access point or the other access points based at least in part on the pathloss measurement or the other pathloss measurements.

4. The method of claim 2, further comprising adjusting the transmission power cap for the plurality of devices based at least in part on receiving an interference report from another access point that indicates at least some interference from at least one of the plurality of devices.

5. The method of claim 4, wherein the interference report comprises a total level of interference at the another access point and a list of dominantly interfering devices, which includes at least one of the plurality of devices.

6. The method of claim 5, wherein the adjusting the transmission power cap comprises adjusting the transmission power cap to an amount based on a difference between the total level of interference and a desired level of interference.

7. The method of claim 1, wherein the adjusting the transmission power cap comprises:
   requesting one or more additional pathloss measurements to the at least one access point or the other access points from the individual device or another of the plurality of devices;
   computing an adjusted transmission power cap based at least in part on the one or more additional pathloss measurements; and
   causing the individual device to communicate according to the adjusted transmission power cap.

8. The method of claim 7, wherein the computing the adjusted transmission power cap is further based at least in part on a type of the at least one access point.

9. The method of claim 7, wherein the requesting the one or more additional pathloss measurements comprises determining that a requested pathloss measurement for the at least one access point is not received, and requesting the one or more additional pathloss measurements for the at least one access point over a different operating frequency of the at least one access point.

10. The method of claim 1, wherein the determining the device transmission power is at or is the threshold level from the transmission power cap is based at least in part on an indication from the individual device.

11. The method of claim 1, further comprising generating the received power threshold based at least in part on the pathloss measurement from the device.

12. The method of claim 1, wherein the computing the transmission power cap is further based at least in part on a noise floor of the at least one access point and a capping threshold.

13. The method of claim 12, further comprising determining the capping threshold based at least in part on at least one of a type of the at least one access point or a number of served devices.

14. The method of claim 1, wherein the device is a co-located network listening module component.

15. The method of claim 1, wherein the causing the plurality of devices to communicate according to the transmission power cap comprises communicating the transmission power cap to the plurality of devices.

16. The method of claim 1, wherein the receiving the pathloss measurement comprises receiving one or more power measurements, and determining the pathloss measurement based at least in part on the one or more power measurements.

17. The method of claim 1, further comprising:
   receiving an additional pathloss measurement to the at least one access point from at least one device according to a timer or other event;
   computing an additional transmission power cap for the plurality of devices based at least in part on the additional pathloss measurement; and
   causing the plurality of devices to communicate according to the additional transmission power cap.

18. The method of claim 1, wherein the at least one access point operates in a same frequency or an adjacent frequency as an access point that receives the pathloss measurement from the device.

19. The method of claim 1, wherein the receiving the pathloss measurement comprises computing the pathloss measurement based at least in part on a received signal code power obtained from the device corresponding to the at least one access point, and a received downlink transmit power of a pilot signal from the at least one access point.

20. An apparatus for determining a transmission power cap for a device to mitigate interference at least at an access point, comprising:
   at least one processor configured to:
      receive a pathloss measurement to at least one access point from a device;
      compute a transmission power cap for a plurality of devices based at least in part on the pathloss measurement, wherein the transmission power cap is common for the plurality of devices;

cause the plurality of devices to communicate according to the transmission power cap; and adjust the transmission power cap for an individual device of the plurality of devices based at least in part on determining a device transmission power is at or a threshold level from the transmission power cap, or on determining a received power of one or more signals from the individual device is at or exceeds a received power threshold; and a memory coupled to the at least one processor.

21. The apparatus of claim 20, wherein the at least one processor computes the transmission power cap further based on other pathloss measurements to the at least one access point or other access points received from the plurality of devices.

22. The apparatus of claim 21, wherein the at least one processor computes the transmission power cap at least in part by determining a minimum of one or more reference transmission powers computed for the at least one access point or the other access points based at least in part on the pathloss measurement or the other pathloss measurements.

23. The apparatus of claim 21, wherein the at least one processor is further configured to adjust the transmission power cap for the plurality of devices based at least in part on receiving an interference report from another access point that indicates at least some interference from the plurality of devices.

24. The apparatus of claim 20, wherein the at least one processor computes the transmission power cap further based at least in part on a noise floor of the at least one access point and a capping threshold.

25. The apparatus of claim 20, wherein the device is a co-located network listening module component.

26. An apparatus for determining a transmission power cap for a device to mitigate interference at least at an access point, comprising:

means for receiving a pathloss measurement to at least one access point from a device;

means for computing a transmission power cap for a plurality of devices device based at least in part on the pathloss measurement, wherein the transmission power cap is common for the plurality of devices;

means for causing the plurality of devices to communicate according to the transmission power cap; and means for determining an individual device transmission power is at or at least a threshold level from the transmission power cap or that a received power of one or more signals from the individual device is at or exceeds a received power threshold, wherein the means for computing adjusts the transmission power cap for the individual device based at least in part on the determination.

27. The apparatus of claim 26, wherein the means for computing computes the transmission power cap further based on other pathloss measurements to the at least one access point or other access points received from the plurality of devices.

28. The apparatus of claim 27, wherein the means for computing computes the transmission power cap at least in part by determining a minimum of one or more reference transmission powers computed for the at least one access point or the other access points based at least in part on the pathloss measurement or the other pathloss measurements.

29. The apparatus of claim 27, further comprising means for receiving an interference report from another access point that indicates at least some interference from the plurality of devices, wherein the means for computing adjusts the transmission power cap for the plurality of devices based at least in part on the interference report.

30. The apparatus of claim 26, wherein the means for computing computes the transmission power cap further based at least in part on a noise floor of the at least one access point and a capping threshold.

31. The apparatus of claim 26, wherein the device is a co-located network listening module component.

32. A computer program product for determining a transmission power cap for a device to mitigate interference at least at an access point, comprising:

a non-transitory computer-readable medium, comprising:

code for causing at least one computer to receive a pathloss measurement to at least one access point from a device;

code for causing the at least one computer to compute a transmission power cap for a plurality of devices based at least in part on the pathloss measurement, wherein the transmission power cap is common for the plurality of devices;

code for causing the at least one computer to cause the plurality of devices to communicate according to the transmission power cap; and code for causing the at least one computer to adjust the transmission power cap for an individual device of the plurality of devices based at least in part on determining a device transmission power is at or a threshold level from the transmission power cap, or on determining a received power of one or more signals from the individual device is at or exceeds a received power threshold.

33. The computer program product of claim 32, wherein the code for causing the at least one computer to compute computes the transmission power cap further based on other pathloss measurements to the at least one access point or other access points received from the plurality of devices.

34. The computer program product of claim 33, wherein the code for causing the at least one computer to compute computes the transmission power cap at least in part by determining a minimum of one or more reference transmission powers computed for the at least one access point or the other access points based at least in part on the pathloss measurement or the other pathloss measurements.

35. The computer program product of claim 33, wherein the non-transitory computer-readable medium further comprises code for causing the at least one computer to adjust the transmission power cap for the plurality of devices based at least in part on receiving an interference report from another access point that indicates at least some interference from the plurality of devices.

36. The computer program product of claim 32, wherein the code for causing the at least one computer to compute computes the transmission power cap further based at least in part on a noise floor of the at least one access point and a capping threshold.

37. The computer program product of claim 32, wherein the device is a co-located network listening module component.

38. An apparatus for determining a transmission power cap for a device to mitigate interference at least at an access point, comprising:

a pathloss receiving component configured to obtain a pathloss measurement to at least one access point from a device;

a Tx power cap computing component configured to compute a transmission power cap for a plurality of devices based at least in part on the pathloss measurement, wherein the transmission power cap is common for the plurality of devices;

a transmitter configured to cause the plurality of devices to communicate according to the transmission power cap; and a cap adjustment triggering component configured to determine an individual device transmission power is at or at least a threshold level from the transmission power cap or that a received power of one or more signals from the individual device is at or exceeds a received power threshold, wherein the Tx power cap computing component adjusts the transmission power cap for the individual device based at least in part on the determination.

39. The apparatus of claim 38, wherein the Tx power cap computing component computes the transmission power cap further based on other pathloss measurements to the at least one access point or other access points received from the plurality of devices.

40. The apparatus of claim 39, wherein the Tx power cap computing component computes the transmission power cap at least in part by determining a minimum of one or more reference transmission powers computed for the at least one access point or the other access points based at least in part on the pathloss measurement or the other pathloss measurements.

41. The apparatus of claim 39, further comprising an interference report receiving component for obtaining an interference report from another access point that indicates at least some interference from the plurality of devices, wherein the Tx power cap computing component adjusts the transmission power cap for the plurality of devices based at least in part on the interference report.

42. The apparatus of claim 41, wherein the interference report comprises a total level of interference at the another access point and a list of dominantly interfering devices, which includes at least one of the plurality of devices.

43. The apparatus of claim 42, wherein the Tx power cap computing component adjusts the transmission power cap at least in part by adjusting the transmission power cap to an amount based on a difference between the total level of interference and a desired level of interference.

44. The apparatus of claim 38, further comprising a measurement requesting component configured to request one or more additional pathloss measurements to the at least one access point or the other access points from the device or the plurality of devices based at least in part on the determining by the cap adjustment triggering component, wherein the Tx power cap computing component adjusts the transmission power cap at least in part by computing an adjusted transmission power cap based at least in part on the one or more additional pathloss measurements, and the transmitter communicates the adjusted transmission power cap to the plurality of devices.

45. The apparatus of claim 44, wherein the Tx power cap computing component computes the adjusted transmission power cap further based at least in part on a type of the at least one access point.

46. The apparatus of claim 44, wherein the measurement requesting component determines that a requested pathloss measurement for the at least one access point is not received, and requests the one or more additional pathloss measurements for the at least one access point over a different operating frequency of the at least one access point.

47. The apparatus of claim 38, wherein the cap adjustment triggering component determines the individual device transmission power is at or at least the threshold level from the transmission power cap based at least in part on an indication from the individual device.

48. The apparatus of claim 38, wherein the cap adjustment triggering component generates the received power threshold based at least in part on the pathloss measurement from the device.

49. The apparatus of claim 38, wherein the Tx power cap computing component computes the transmission power cap further based at least in part on a noise floor of the at least one access point and a capping threshold.

50. The apparatus of claim 49, wherein the Tx power cap computing component determines the capping threshold based at least in part on at least one of a type of the at least one access point or a number of served devices.

51. The apparatus of claim 38, wherein the device is a co-located network listening module component.

52. The apparatus of claim 38, wherein the transmitter signals the transmission power cap to the plurality of devices to cause the plurality of devices to communicate according to the transmission power cap.

53. The apparatus of claim 38, wherein the pathloss receiving component receives one or more power measurements and determines the pathloss measurement based at least in part on the one or more power measurements.

54. The apparatus of claim 38, wherein the pathloss receiving component receives an additional pathloss measurement to the at least one access point from at least one device according to a timer or other event, the Tx power cap computing component computes an additional transmission power cap for the plurality of devices based at least in part on the additional pathloss measurement, and the transmitter causes the plurality of devices to communicate according to the additional transmission power cap.

55. The apparatus of claim 38, wherein the at least one access point operates in a same frequency or an adjacent frequency as an access point that receives the pathloss measurement from the device.

56. The apparatus of claim 38, wherein the pathloss receiving component computes the pathloss measurement based at least in part on a received signal code power obtained from the device corresponding to the at least one access point, and a received downlink transmit power of a pilot signal from the at least one access point.

* * * * *